US010924798B2

(12) United States Patent
Sivertsen et al.

(10) Patent No.: US 10,924,798 B2
(45) Date of Patent: Feb. 16, 2021

(54) NETWORK VIDEO TRANSMITTER AND RECEIVER DISPLAY SYSTEM WITH AUTO-ADJUSTABLE POWER AND REMOTE HOST WAKEUP

(71) Applicant: Advoli Limited, Wanchai (HK)

(72) Inventors: Clas Gerhard Sivertsen, Lilburn, GA (US); Paal Fure Torkehagen, Taipei (TW)

(73) Assignee: ADVOLI LIMITED, Wanchai (HK)

( * ) Notice: Subject to any disclaimer, the term of this patent is extended or adjusted under 35 U.S.C. 154(b) by 54 days.

(21) Appl. No.: 16/401,458

(22) Filed: May 2, 2019

(65) Prior Publication Data
US 2020/0351547 A1    Nov. 5, 2020

(51) Int. Cl.
| | |
|---|---|
| *H04N 21/4363* | (2011.01) |
| *H04N 21/235* | (2011.01) |
| *H04N 21/238* | (2011.01) |
| *H04N 21/443* | (2011.01) |

(52) U.S. Cl.
CPC ..... *H04N 21/43637* (2013.01); *H04N 21/238* (2013.01); *H04N 21/2353* (2013.01); *H04N 21/4436* (2013.01)

(58) Field of Classification Search
CPC .............. H04N 21/61; H04N 21/6118; H04N 21/6168; H04N 21/43637; H04N 21/238; H04N 21/2353; H04N 21/4436
See application file for complete search history.

(56) References Cited

U.S. PATENT DOCUMENTS

| | | | | |
|---|---|---|---|---|
| 2010/0054275 | A1* | 3/2010 | Noonan | H04L 12/282 370/462 |
| 2016/0282922 | A1* | 9/2016 | Petrovic | G06F 1/3296 |
| 2017/0149856 | A1* | 5/2017 | Liu | H04N 21/2381 |
| 2017/0188485 | A1* | 6/2017 | Peterson | H05K 7/20772 |
| 2018/0219635 | A1* | 8/2018 | Sipes, Jr. | H04B 10/077 |

* cited by examiner

*Primary Examiner* — Omar S Parra
(74) *Attorney, Agent, or Firm* — Locke Lord LLP; Tim Tingkang Xia, Esq.

(57) ABSTRACT

A display system includes a network video transmitter with a video input, being placed in a minimalist chassis system, and communicatively connected to a power supply of the minimalist chassis system located in a secure area (SA). A network video receiver with a video output is located in a public area (PA), and communicatively connected to a display device. A network cable connects the network video transmitter to the network video receiver. The network cable transmits the video signal from the network video transmitter to the network video receiver and transmits power between the network video transmitter and the network video receiver, and the network cable has power conductors capable of carrying the power. The power supply is configured to provide power to both the network video transmitter and the network video receiver, and no power supply is required in the PA.

19 Claims, 28 Drawing Sheets

500

Simple Fibre Optic Cable

504

Fibre Optic Cable
With 2 Power Conductors

Fibre Optic Cable
With 4 Power Conductors

Dual Fibre Optic Cable
With n Power Conductors

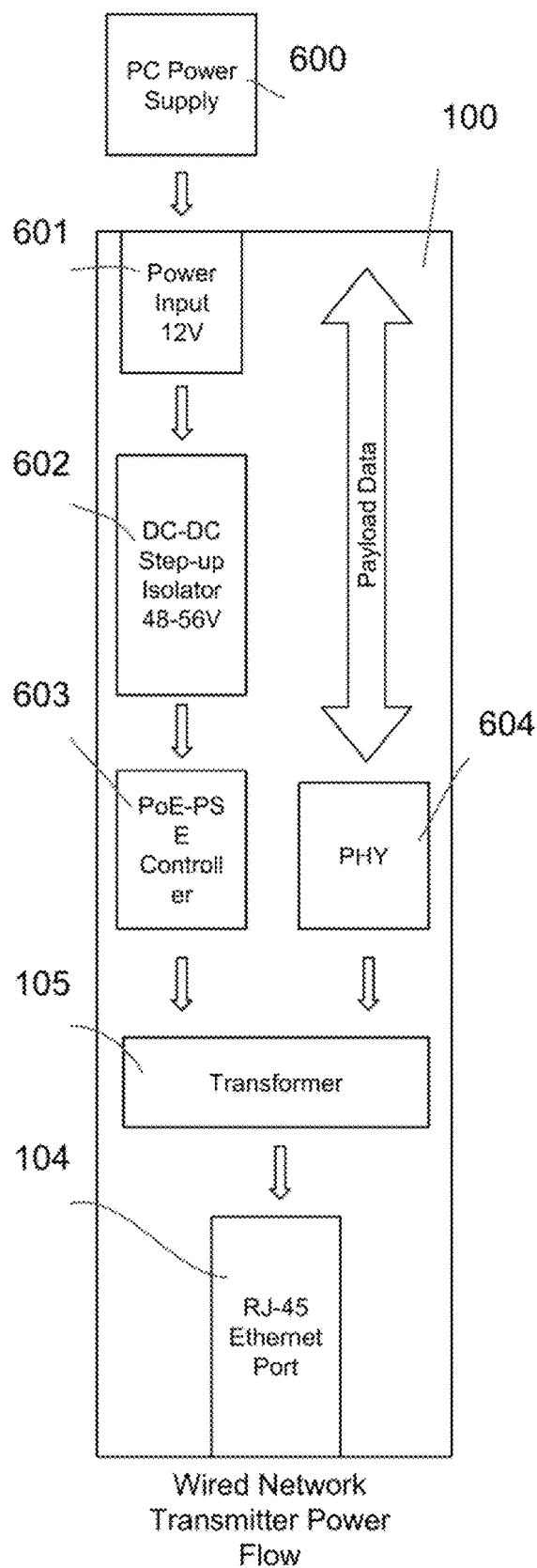
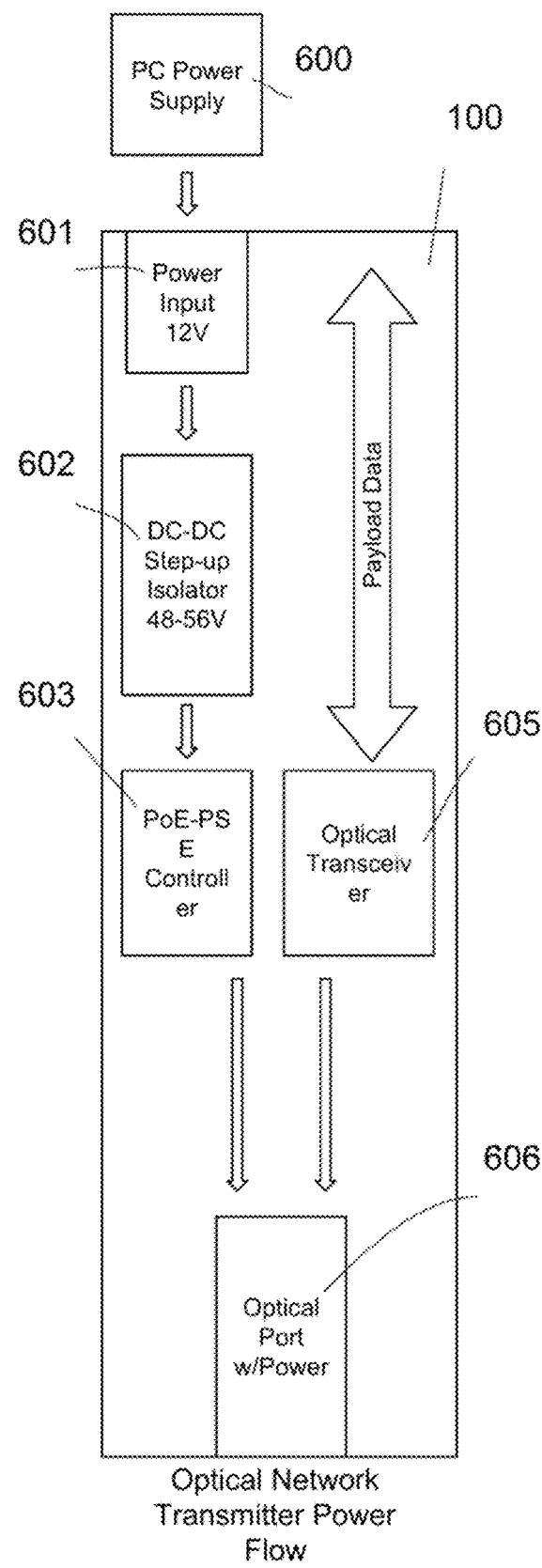
Figure 6A
Figure 6B

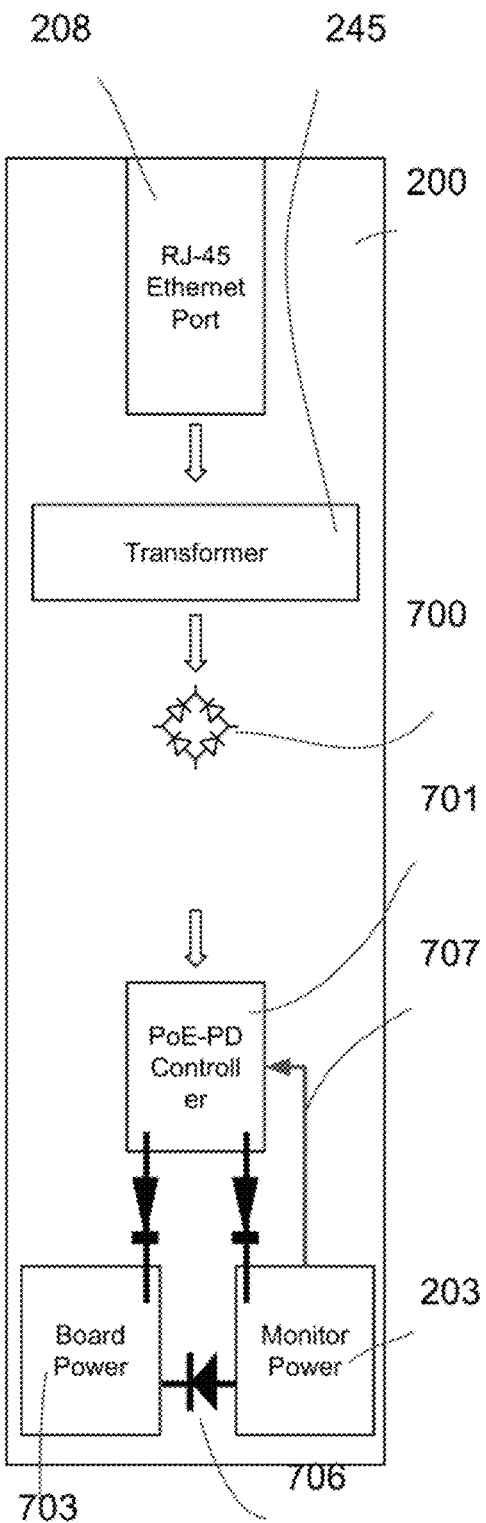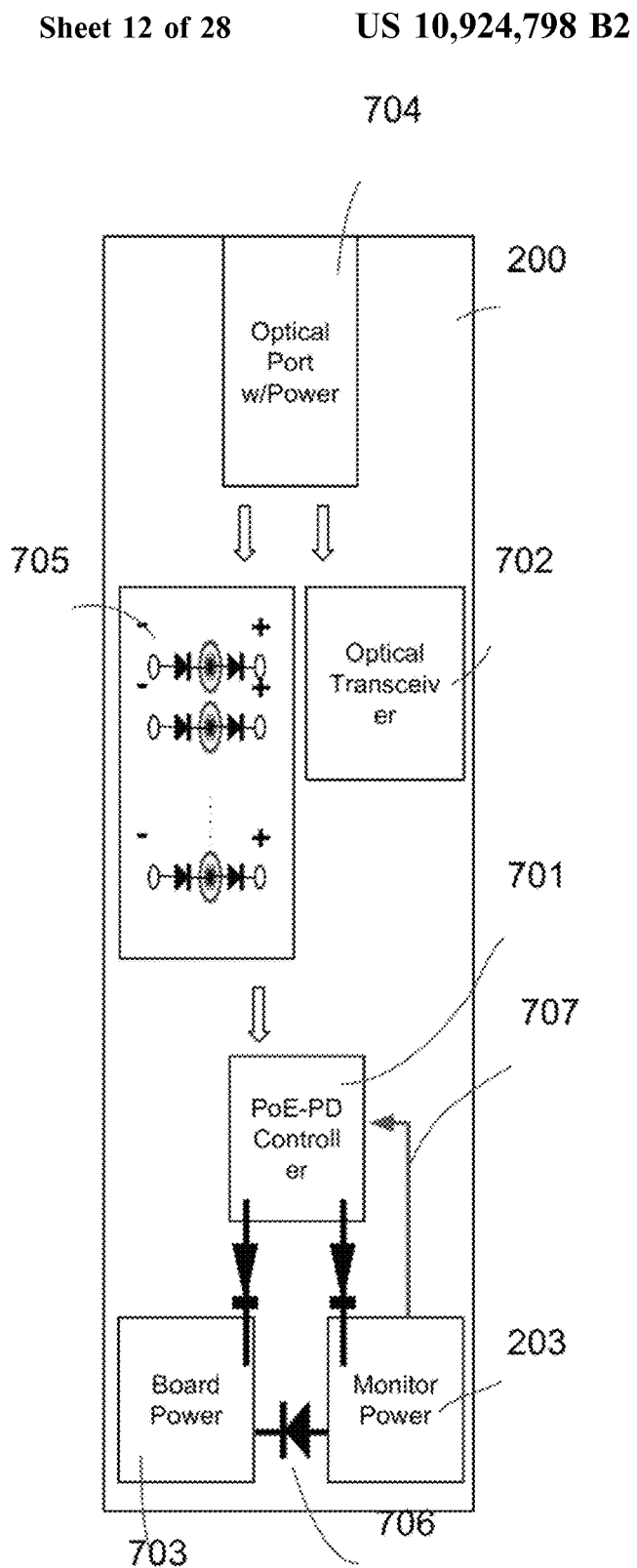
Figure 7A — Wired Network Receiver Power Flow
Figure 7B — Optical Network Receiver Power Flow

NETWORK VIDEO TRANSMITTER AND RECEIVER DISPLAY SYSTEM WITH AUTO-ADJUSTABLE POWER AND REMOTE HOST WAKEUP

FIELD

The disclosure relates generally to transmitters and receivers, and more particularly to a network video transmitter and receiver display system with auto-adjustable power and remote host wakeup features.

BACKGROUND

Video displays have become ubiquitous both in private and public areas to show information, advertisement, and entertainment. Traditionally, displays have been receiving the content from broadcast, or from a video source in close proximity of the display itself, in which case a cable is used to transfer the data from source to the display. Modern video cables that use DisplayPort, HDMI, Thunderbolt, or USB type-C (USB-C) have length limitations, where the maximum allowable cable length becomes shorter and shorter as the quality (resolution, refresh-rate and color depth) of the video content gets better and better. This means that the video source must be located ever closer to the display as the quality continues to improve.

Traditionally, displays require substantially two cable connections; a power cable and a video cable. Many display applications require affixing of displays high up on walls, hanging down from or mounted up on poles, in such a way that it is costly and impractical to install electrical outlets close enough to practically plug the display into the power socket. Popular video standards such as DisplayPort (DP) and High Definition Multimedia Interface (HDMI) have limitation in cable length of only a few meters for content with high data rate (resolution, refresh rate, and color depth).

Many display applications also require additional interfaces such as Infrared (IR) or Serial Port for control of the displays, Ethernet for combined WiFi access points and smart TV functionality and USB peripherals for interaction with Keyboard/Mouse, and display of content on Flash Drives and other Data Storage Devices.

Therefore, the need arises for a solution that use only a single inexpensive cable that is easy and practical to install, that can work further away from the video source, and that ultimately powers the display itself.

The most popular video source has by far become the modern Personal Computer (PC), either in a traditional economical box style enclosure or any number of compact sizes and form factors. For the PC to be useful as video source, it must be connected to an AC mains power and in most cases also connected to the internet through a wired LAN connection through a router. While the most suitable and practical location for the PC is often near power and Ethernet connections, the ideal location of the display may be far from the location of the PC. Thus, the need arises for a solution that connects the display to the PC easily and inexpensively, and that provides an extension for all of the typical interfaces of the PC and display.

In many display installations it is not convenient and it is expensive to have an electrician install power plugs next to the display and route electrical power cables through walls and across rooms into the nearest power panel, to the point where the electrical installation would exceed the cost of the display itself. Category Network cables are much easier to install and route, and does not require certified electricians to be installed, and may in many cases can be installed by the end user.

In other installations it simply is not allowable to have the PC within reach of a traditional display cable, such as in surgery rooms, banks, in military installations, factories, outdoors, and in places where machines can cause interferences with the equipment such as MRI machines or robotic welding machines.

In yet other installations it is simply not practical or safe to have the PC near the display, such as for Digital Video Recording equipment, which needs to be located in a secure room, and the display, which needs to be near guards or entry points. In Internet café s, casinos and places where users don't need or should be able to physically access the PC hardware, it is also practical to extend the PC into another room and away from the display or operator.

Lastly, some high performance PCs are bulky and noisy due to high performance hardware and fans, and thus need to be separated from the display. It is with these use cases in mind that this invention proves its usefulness and inevitability.

SUMMARY

In view of the above deficiencies, one aspect of this disclosure relates to bidirectional transport of data between a Transmitter and Receiver, including but not limited to video, audio, USB, and control signals, across a network, through an electrical power conductive cable such as copper, or a fiber optical network cable including isolated power, where a power supply in one end of the network may power all the devices in the system.

Another aspect of this disclosure teaches the method in which a powered down Receiver can bring a Transmitter from standby to full power mode, although it could analogously be the Transmitter that wakes up the Receiver if the power supply is located within the Receiver.

Yet another aspect of this disclosure teaches how the Receiver can power any typical PC Monitor, projector or other Display Device with a DC input connector safely and reliably although the voltage required may vary between devices and not be known and does not need to be configured by the operator.

A further aspect of this disclosure teaches how the Receiver may additionally power internal devices as well, such as wireless chargers, USB chargers, and Video Conversion or Processing devices.

Yet a further aspect of this disclosure teaches a number of embodiments where typical use cases of the inventions hereinafter are described.

The current invention describes a system that combines a multitude of interfaces with power and allows a single Ethernet/LAN cable or optical cable to be used between a source and display unit.

One aspect of the disclosure relates to a network video transmitter, which includes: a video input configured to receive a video signal; a network video processor configured to control the video signal received by the video input to be transmitted to a network video receiver; a network port configured to be connected to the network video receiver via a network cable, wherein the network cable is configured to transmit the video signal processed by the network video processor to the network video receiver and transmit power between the network video transmitter and the network video receiver, and the network cable has power conductors capable of carrying the power; a power connector being connected to a power supply of a host computing device, wherein the power supply is configured to convert an alternating current (AC) power to standby power and normal operating power, and to provide the standby power and the normal operating power to the power connector, such that the normal operating power is provided for operation of both the network video transmitter and the network video receiver; and a sensing circuit, powered from the standby power and connected to the power conductors of the network cable, wherein when the sensing circuit senses one or more voltage pulses across the network cable, the sensing circuit enables full power of the host computing device.

In certain embodiments, the network port is an Ethernet local area network (LAN) port or a fiber optical network port, and the network cable is a CAT-5 or CAT-6 Ethernet cable or a fiber optic cable.

In certain embodiments, the video input is DVI, HDMI, DisplayPort, Thunderbolt 3 or USB type-C (USB-C).

In certain embodiments, the video signal passes through a Display Stream Compression (DSC) circuit, or an HDMI to USB type-C, DVI or DisplayPort conversion circuit.

In certain embodiments, the network video transmitter further includes an isolated power converter, wherein the received power is galvanically isolated from the main input so that a difference in ground potential between the network video transmitter and network video receiver will not cause current to flow through the ground path. The network video transmitter is configured to sense a presence of the network video receiver being connected to the network cable through signaling on the power conductors of the network cable, and to provide and isolate power to the network video receiver such that a substantial difference in ground potential may exist between the network video transmitter and the network video receiver.

In certain embodiments, connector headers connect in parallel with typical two-pin power and reset switches and then connect to typical motherboard headers of a motherboard of the host computing device for controlling power and reset of the host computing device, allowing the network video transmitter locally and the network video receiver remotely to power up, power down and reset a PC the motherboard of the host computing device, and allows for the network video transmitter to see that a local operator has physically pressed the power or reset button of the host computing device.

In certain embodiments, the host computing device is a minimalist chassis system.

Another aspect of the disclosure relates to a network video receiver, which includes: a video output, communicatively connected to a display device, and configured to transmit a video signal to the display device; a network video processor configured to control the video signal received from a network video transmitter to be transmitted to the display device via the video output; a network port configured to be connected to the network video transmitter via a network cable, wherein the network cable is configured to transmit the video signal from the network video transmitter to the network video receiver and transmit power between the network video transmitter and a corresponding video receiver, and the network cable has power conductors capable of carrying the power; a power connector being connected to a power supply of a host computing device through the network video transmitter, wherein the power supply is configured to convert an alternating current (AC) power to normal operating power, and to provide the normal operating power to the power connector through the network video transmitter, such that the normal operating power is provided for operation of both the network video transmitter and the network video receiver; and a rechargeable battery electrically connected to the power connector, wherein the rechargeable battery is configured to be charged by the normal operation power during a normal operation, and when the power supply of the host computing device is off, the rechargeable battery is configured to generate voltage pulses and send the voltage pulses to the power conductors of the network cable to indicate the network video transmitter to power up the power supply of the host computing device in a operation mode.

In certain embodiments, the network port is an Ethernet local area network (LAN) port or a fiber optical network port, and the network cable is a CAT-5 or CAT-6 Ethernet cable or a fiber optical cable.

In certain embodiments, the video input is DVI, HDMI, DisplayPort, Thunderbolt 3 or USB type-C (USB-C).

In certain embodiments, the video signal passes through a Display Stream Compression (DSC) circuit. DSC is a standard released in July 2014 by the Video Electronics Association (VESA), and enables "visually lossless" compression between a video source and a display, where "visually lossless" means that there is no perceivable difference in the quality of the image or video when compression/decompression is applied.

In certain embodiments, the network video receiver further includes an isolated power converter that supplies the voltages required for components within the network video receiver.

In certain embodiments, the network video receiver further includes a power button, wherein the power button of the network video receiver is connected to a power button header of the network video transmitter through the network video processor, such that when power of a host computing device being connected to the network video transmitter is on, a push on the power button of the network video receiver causes a power switch on the host computing device to be closed, thus initiating a power down event on the host computing device.

In certain embodiments, when the power of the host computing device is off and the power button of the network video receiver is pushed, a battery connected to a voltage step-up circuit delivers a series of voltage pulses on the power conductors of the network cable that is sensed by a circuit on the Transmitter running from standby power, and that simulates a power switch press to the Host PC, causing the PC to power up as it normally would when the power button is pressed.

In certain embodiments, the network video receiver further includes a reset button, wherein the reset button of the network video receiver are connected to a power button header of the network video transmitter through the network video processor, such that when power of a host computing device being connected to the network video transmitter is on, a push on the reset button of the network video receiver causes a reset switch on the host computing device to be closed, thus initiating a reset event on the host computing device.

In certain embodiments, the network video receiver further includes an internal power circuit capable of receiving power from the power conductors of the network cable, wherein the internal power circuit is configured to isolate the power, so that a substantial voltage difference is present between the network video transmitter and the network video receiver, and provide some of this power to a power jack of the display device.

In certain embodiments, a number of electrically conductive pins representing the video output and other various interfaces of the network video receiver are made available for a secondary Printed Circuit Board Assembly (PCBA) to be temporarily or permanently attached, wherein the secondary PCBA forms an Expansion Board (EB) module.

In yet another aspect of the disclosure, a display system includes: a network video transmitter with a video input, configured to be placed in a minimalist chassis system, and configured to be communicatively connected to a power supply of the minimalist chassis system located in a secure area (SA); a network video receiver with a video output located in a public area (PA), and configured to be communicatively connected to a display device; and a network cable connecting the network video transmitter to the network video receiver, wherein the network cable is configured to transmit the video signal from the network video transmitter to the network video receiver and transmit power between the network video transmitter and the network video receiver, and the network cable has power conductors capable of carrying the power; wherein the power supply is configured to provide power to both the network video transmitter and the network video receiver, and no power supply is required in the PA.

In certain embodiments, the network video receiver comprises a rechargeable battery, wherein the rechargeable battery is configured to be charged by a normal operation power transmitted from the power supply of the minimalist chassis system through the network video transmitter during a normal operation, and when the power supply of the minimalist chassis system is off, the rechargeable battery is configured to generate voltage pulses and send the voltage pulses to the power conductors of the network cable to indicate the network video transmitter to power up the power supply of the minimalist chassis system in a operation mode.

In certain embodiments, the network video transmitter comprises a sensing circuit, powered from a standby power provided by the power supply of the minimalist chassis system and connected to the power conductors of the network cable, wherein when the sensing circuit senses the voltage pulses across the network cable, the sensing circuit powers up the power supply of the minimalist chassis system in a operation mode.

BRIEF DESCRIPTION OF THE DRAWINGS

The accompanying drawings illustrate one or more embodiments of the invention and together with the written description, serve to explain the principles of the invention. It is noted that, in accordance with the standard practice in the industry, various features are not drawn to scale. In fact, the dimensions of the various features may be arbitrarily increased or reduced for clarity of discussion. Wherever possible, the same reference numbers are used throughout the drawings to refer to the same or like elements of an embodiment, and wherein:

FIG. 6A shows a block diagram of the power flow of the Network Video Transmitter in a Wired Network connection according to one embodiment of the disclosure.

FIG. 6B shows a block diagram of the power flow of the Network Video Transmitter in an Optical Network connection according to another embodiment of the disclosure.

FIG. 7A shows a block diagram of the power flow of the Network Video Receiver in a Wired Network connection according to one embodiment of the disclosure.

FIG. 7B shows a block diagram of the power flow of the Network Video Receiver in an Optical Network connection according to another embodiment of the disclosure.

DETAILED DESCRIPTION

Figure 1:
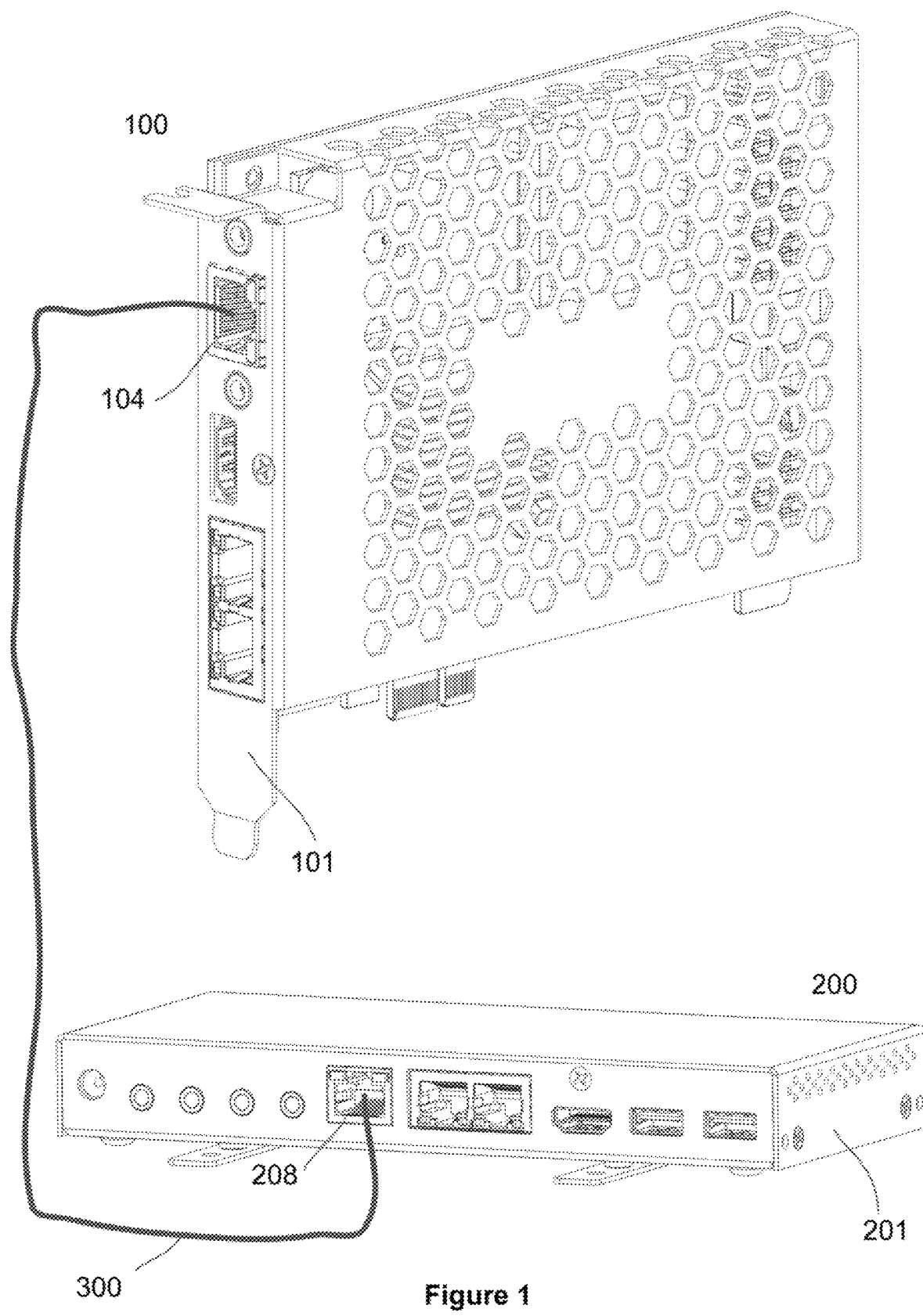
FIG. 1 is a combined view of a single channel transmitter 100 and a single channel receiver 200 side by side, interconnected by an Ethernet cable 300 according to one embodiment of the disclosure.

The following disclosure provides several embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

A typical video source may be a DVR, Blue Ray Player, a network video player (such as AppleTV, Roku, Amazon Fire, and Google Chromecast, etc), or it can be a Game Console or simply a PC. A typical display unit may be a PC-monitor, an LCD/OLED display, an LED video wall, or a projector.

The display system described in this invention contains both a "Power Capable Network Video Transmitter" (PCNVTx) and a matching "Power Capable Network Video Receiver" (PCNVRx), which are interconnected through an Ethernet/LAN type cable, such as a Category 5 (CAT5), Category 6 (CAT6) cable, or fiber optical cable. From here on we will call the PCNVTx just "the Transmitter" and the PCNVRx just "the Receiver".

"Power Capable" hereinafter means that the both the Transmitter and Receiver when connected can supply the other with power through the Network, and there is only one Power Supply required attached to either the Transmitter or Receiver. Both the Transmitter and Receiver may of course be powered by separate Power Supplies, operate normally as such, and may autonomously go from being powered from an attached local power display, through the network, or both, where adding and removing power supplies has no effect on the operation as long as there is at least ONE power supply attached to either Transmitter or Receiver. Hence the description "Power Capable".

Both the Transmitter and the Receiver each have at least two embodiments described hereinafter.

In one popular embodiment the Transmitter is designed as a PCI express form factor, it may be placed into a typical PC occupying a single PCI express x1 or larger PCI express slot. This first embodiment of the Transmitter is to be understood as the "internal configuration".

For use with all other video sources than internal to a PC, the embodiment is to be understood as an "external configuration". In this configuration the PCI express card is placed into an enclosure that connects the PCI express bus to an internal carrier PCB that supplies power to the circuitry. In this configuration the connectors, internal ports, and the auxiliary power of the PCI express card that is not available through the external bracket is connected through internal cables to the carrier PCB, and exposed to the outside through connectors. Note that the "external configuration" also can be used with a PC, in the use case where the PC is connected to the Transmitter located in an external enclosure. It should be understood however, that the Transmitter may not need to be in the form factor of a PCI express card, but rater any suitable shape for its application.

Graphics cards for computers may come in the form of Peripheral Component Interconnect ("PCI") Express cards that interface through a computer by way of a PCI Express Interface. Most PC motherboards also have one or more graphics ports most often located within the IO-port panel. Traditional motherboards will have VGA and DVI ports, whereas newer motherboards will have HDMI and DP. Even newer motherboards may have USB-type-C or Thunderbolt ports that may be used as interfaces for external displays to a PC. Typical PCs have power supplies that come with auxiliary power connectors specifically to power PCI express graphics cards through a 6- or 8-pin AUX connector. Additionally, the power may be sourced from a Thunderbolt connector.

In one embodiment this invention mounts into a PC as a standard Graphics card, and physically mounts into the PCI express bus, but does not actually present a video controller unit on the PCI bus. Rather, it receives one or more of video inputs from the PC through an external cable, and then converts the video signal to one or more HDBaseT ports that are exposed through the PCI bracket. Because this invention does not actually contain a GPU, it does not require the Auxiliary power supply for graphics processing. But it rather uses the Aux power to supply the external display itself through the HDBaseT port(s).

Certain embodiments of this disclosure provide a display system including a Transmitter 100 and a Receiver 200 interconnected through a Network Cable 300. FIG. 1 is a combined view of a single channel transmitter 100 and a single channel receiver 200 side by side, interconnected by an Ethernet cable 300 according to one embodiment of the disclosure. The Transmitter 100 typically has a mechanical housing or enclosure 101 and a Printed Circuit Board Assembly (PCBA) 102. The Receiver 200 typically has a mechanical housing or enclosure 201 and a Printed Circuit Board Assembly (PCBA) 202.

Figure 2A:
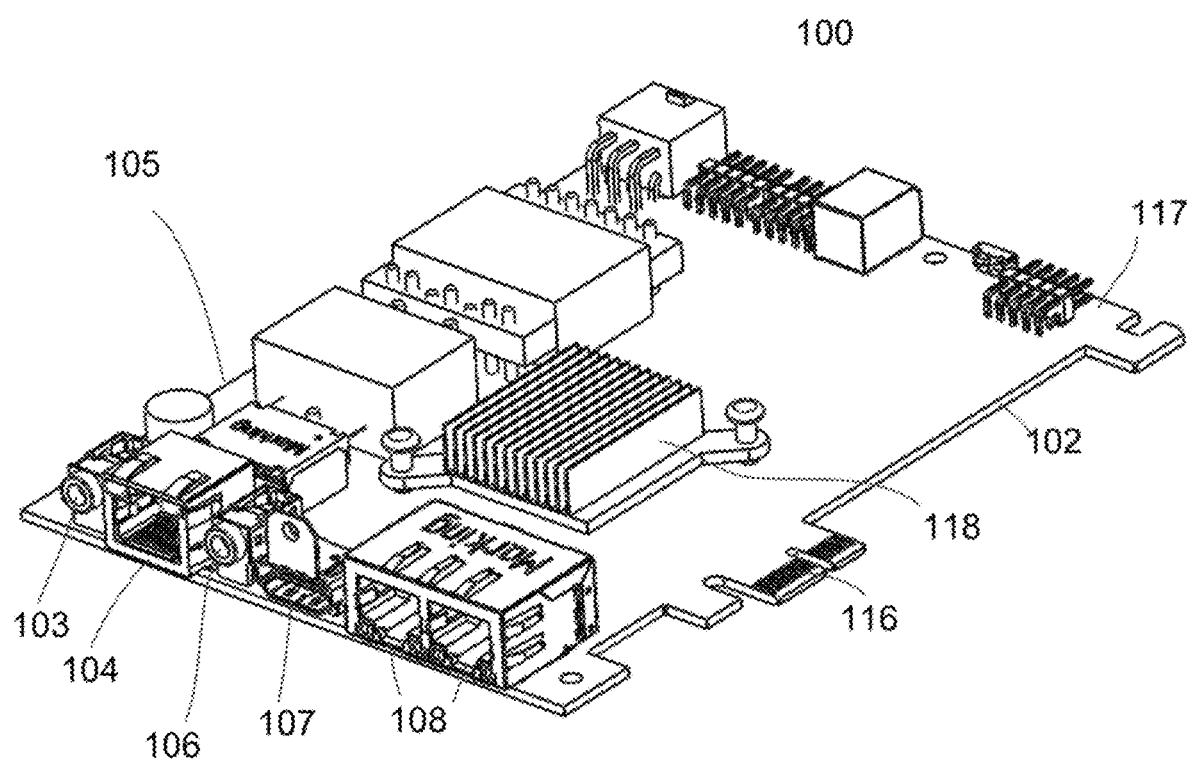
FIG. 2A is a perspective view of a single channel Network Video Transmitter 100 according to one embodiment of the disclosure.
Figure 2B:
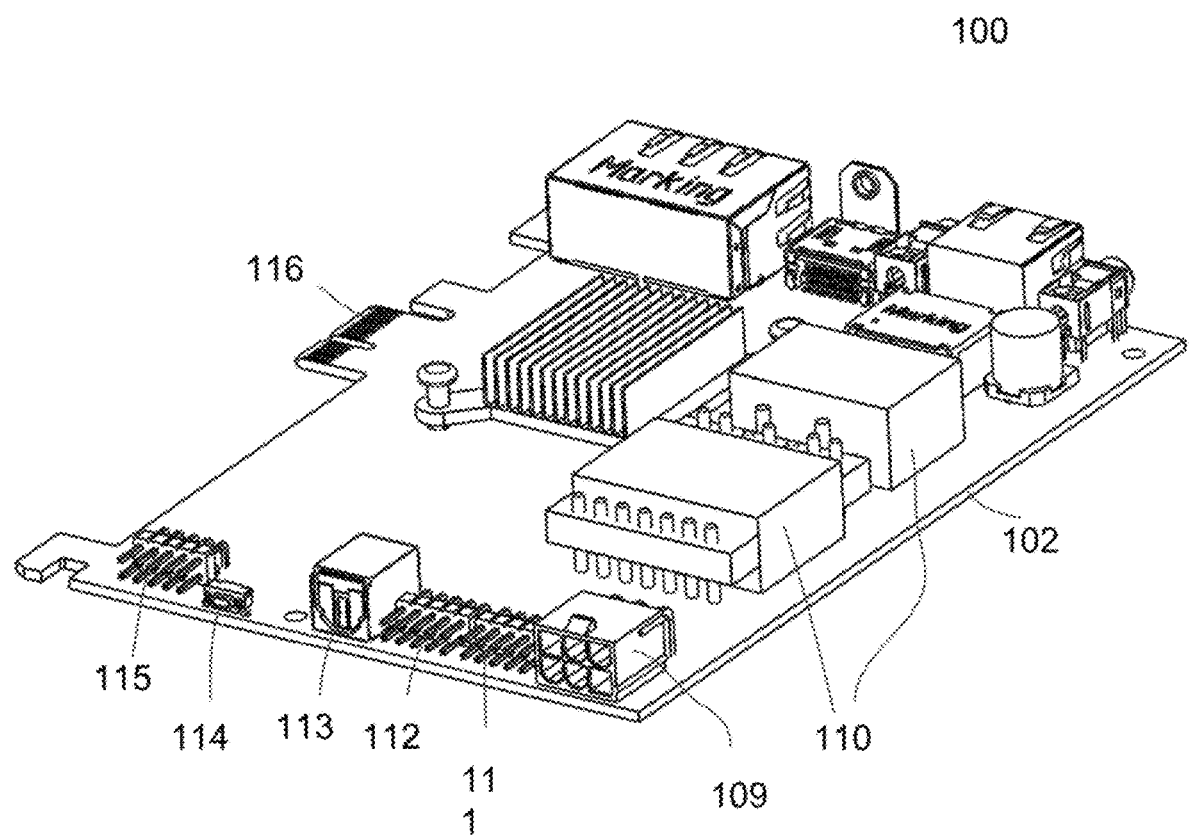
FIG. 2B is a perspective view of the single channel Network Video Transmitter 100 of FIG. 2A from a different viewing angle according to one embodiment of the disclosure.

FIGS. 2A and 2B show two different views of a single channel Network Video Transmitter 100 according to certain embodiments of the disclosure. Specifically, the single channel Network Video Transmitter 100 as shown in each of FIGS. 2A and 2B is in the form of a PCI express card 117 with PCB 102 and gold fingers 116, where the mechanical bracket 101 is not shown for clarity. FIG. 2A is a view substantially of the typically exposed front ports for Infrared Transmitter In 106 and Out 103, Network Video Port with Power 104, HDMI input 107 as the video input, and Ethernet Ports 108. The Ethernet Transformer 105 and a Heat sink 118 covering the main processor is also shown. FIG. 2B is a rotated view focusing on the internal ports that connect power 109, control signals USB 111 and Audio 112 signals, typically to a PC motherboard. Digital Audio SPDIF 113, a reset button 114, the Power and Reset Header 115 are also depicted.

On the Transmitter; Video input 107 from a PC, audio input/output 112, USB 111, control signals and power 109 are connected through standard interface cables to a PCI express card 100 with a PCI express card edge gold-fingers 116 typically located inside the said PC. The video source may however not be limited to that of the PC itself even though the card is located within the PC. The PCI express card then combines all of the signals and transmits them over a single network cable 300 to a receiver 200.

In certain embodiments, the video input 107 can be any type of input such as DVI, HDMI, DisplayPort, Thunderbolt 3 or USB type-C (USB-C), and the video data may pass through a Display Stream Compression (DSC) Circuit allowing for higher refresh rates and more color depth.

In certain embodiments, the USB 111 is a USB header or a USB controller chip connected through the PCIe bus, that multiplexes the USB signal onto the Network interface through a Network Video Processor, making devices plugged into the Receiver appear as they are connected as a local USB connection through a USB hub.

In certain embodiments, the Ethernet Transformer 105 can be implemented by one or more Ethernet LAN ports connected to a hub, where the Ethernet signals are multiplexed on to the Network through the Network Video Processor, making devices with Ethernet plugged into the Receiver appear as they are connected locally through a hub.

In certain embodiments, the Analog and Digital input and output Audio ports 112, with connections made through standard Audio Jack connectors for Microphone, Headset, Line Audio, SPDIF or standard Motherboard Audio Headers, where Audio devices plugged into the Receiver appear as they are plugged in locally to the Receiver.

In certain embodiments, the signals to and from an Infrared transmitter 103 and receiver 106 are plugged into the Transmitter, and their signals multiplexed onto the Network through the Network Video Processor, gets respectively received and driven by the receiver, appearing as if the Infrared devices were connected locally.

In certain embodiments, connector headers connect in parallel with two-pin power and reset switches and then connect to motherboard headers for controlling power and reset, allowing the Transmitter locally and the Receiver remotely to power up, power down and reset a PC motherboard, and allows for the Transmitter to see that a local operator has physically pressed the Power or Reset button.

In certain embodiments, the Transmitter may include one or more serial ports connected to a Microcontroller (uC) that converts the serial ports to a Virtual Comport and makes them appear on a PC through a USB connection as physical serial ports.

In certain embodiments, the Transmitter may include one or more serial ports connected to a Microcontroller on the Receiver that converts the serial ports to Virtual Comports and makes them available on the Transmitter through USB, making them appear as they are physical serial ports connected locally to the PC.

FIGS. 3A, 3B, 3C and 3D show a typical embodiment of a Network Video Receiver from different viewing angles. Specifically, the Network Video Receiver 200 as shown in each of FIGS. 3A, 3B, 3C and 3D is in the form of a standalone Printed Circuit Board Assembly inside a mechanical housing, where the mechanical housing is not shown for clarity.

Figure 3A:
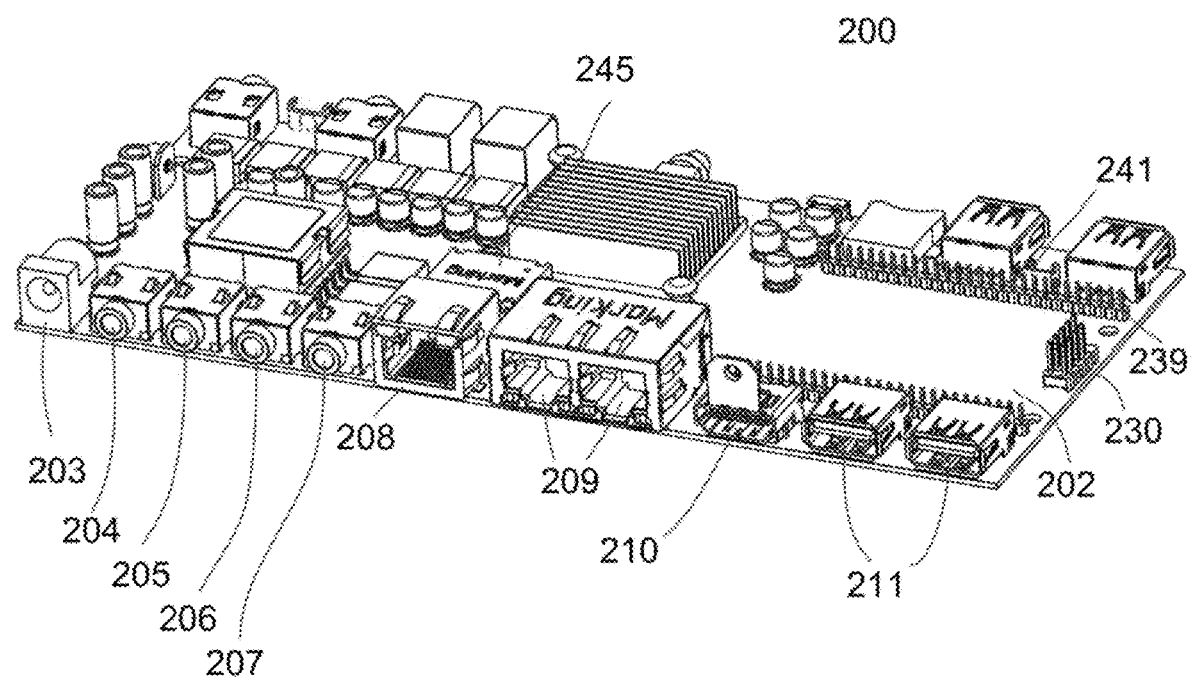
FIG. 3A is a perspective view of a Network Video Receiver 200 according to one embodiment of the disclosure.

FIG. 3A shows a view of the Network Video Receiver 200 substantially showing the ports that face a display device. The components of the Network Video Receiver 200 as shown in FIG. 3A include, without being limited thereto: a power connector 203 which can be both a power output and power input; a Line Audio Output 204; a RS-232 Serial Port 205; Infrared In 206 and Out 207; a Network Video Connector 208 for connection to the Network Video Transmitter 100; a Dual LAN Ethernet Port 209 for hub connection; an HDMI output connector 201 as a video output; USB ports 211; a standard fan connector 241 for fan connection; a Ethernet Transformer 245; an additional USB header 230; and area for the Expansion Board 202.

Figure 3B:
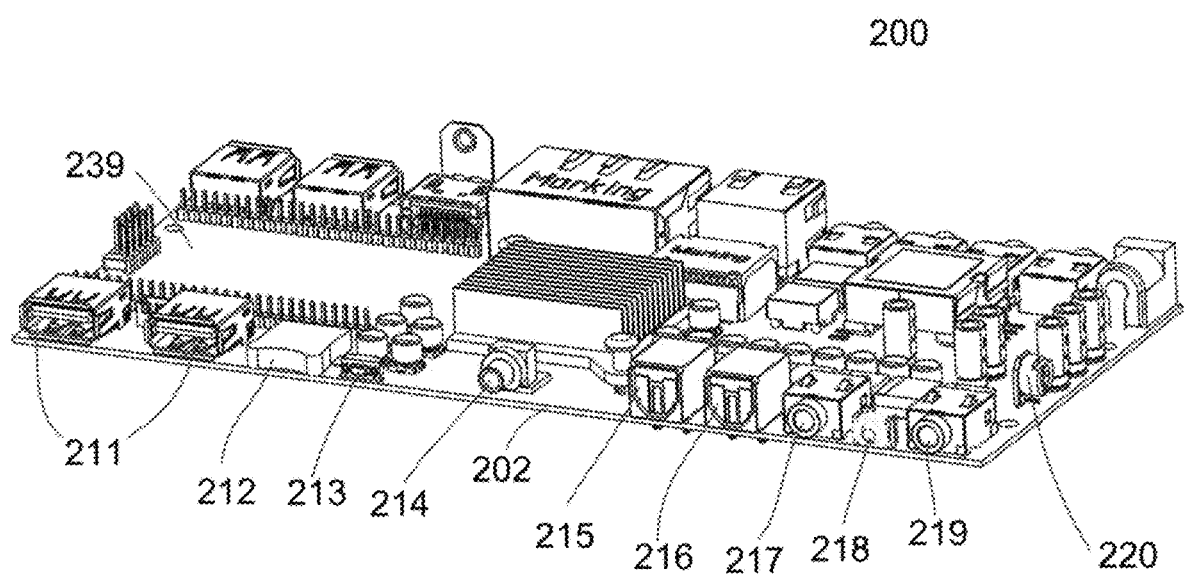
FIG. 3B is a perspective view of the Network Video Receiver 200 of FIG. 3A from a different viewing angle according to one embodiment of the disclosure.

FIG. 3B shows a rotated view of the of the Network Video Receiver 200, showing the ports that substantially face a user or operator. The components of the Network Video Receiver 200 as shown in FIG. 3A include, without being limited thereto: a USB connectors 211, a Battery Holder 212, a reset button 213, a Lighted Power Button 214, Digital Audio SPDIF In 215 and Out 216, a RS232 Debug UART 217, an infrared receiver 218, an Audio Headphone Jack 219, and a Voltage Adjustment Potentiometer 220 for the control of the output voltage on power connector 203.

Figure 3C:
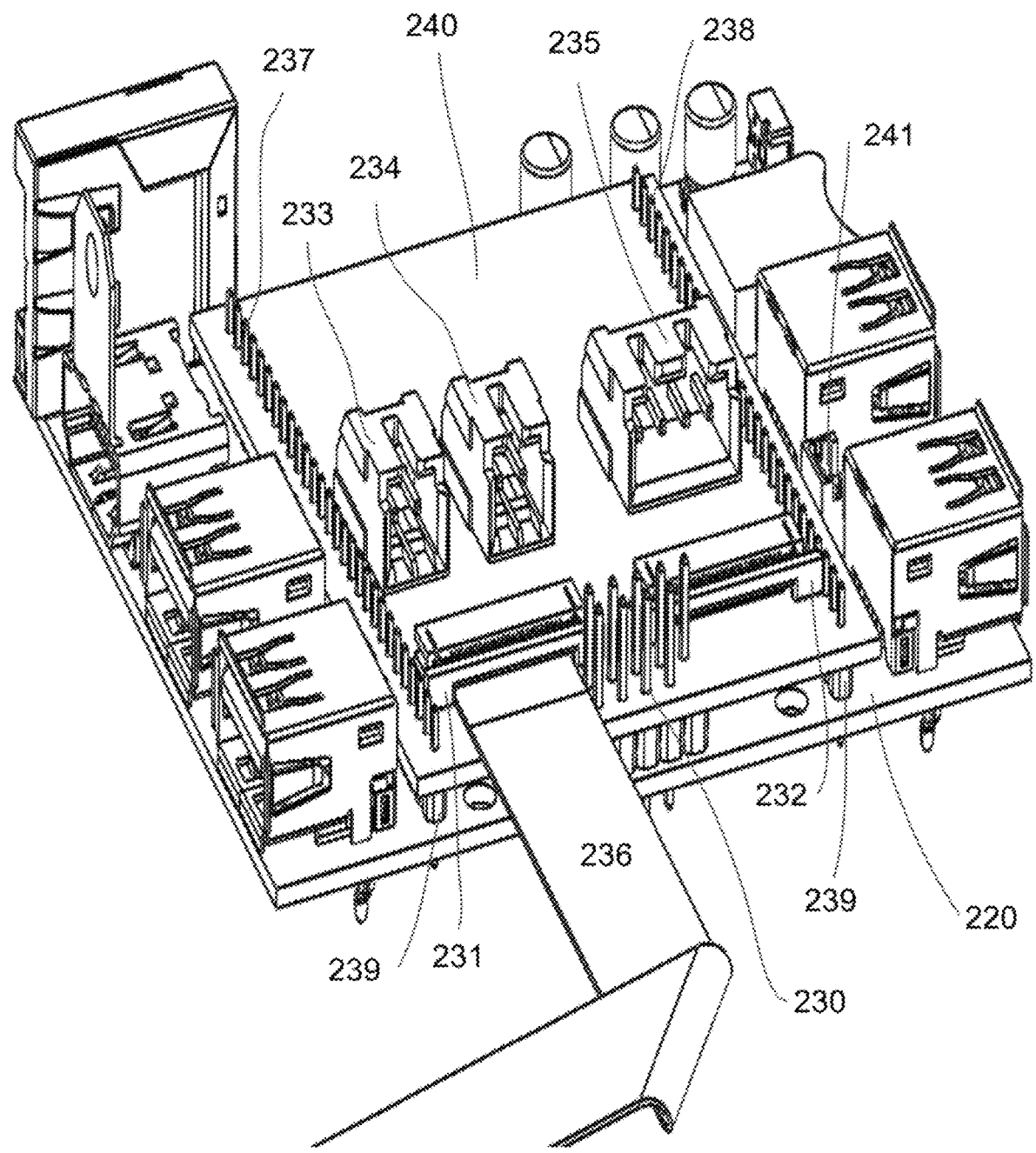
FIG. 3C is a perspective view of the Network Video Receiver 200 of FIG. 3A from a different viewing angle according to one embodiment of the disclosure.

FIG. 3C shows a focused view of a particular feature of the Network Video Receiver 200 named the "Expansion Board" 240 for one embodiment specifically targeted applications where the Network Receiver 200 is located within a Display Device. While the expansion board 240 may come in a variety of configurations, FIG. 3C shows a version targeted for an in-LCD configuration with Audio Speaker Connectors 233 and 234 respectively for Left and Right Audio, Backlight Power 235, and Video Data and power 231 and 232 for the LCD in through a flat ribbon cable 236. Through hole header connectors 237, 238, 239 connect the Receiver PCB baseboard 220 to the Expansion Board 240, which may be soldered or plugged in for modularity and ease of service.

FIG. 3D again shows a focused view of another version the Expansion Board 244, but with a configuration typically used for display output to a multitude of monitors, in this particular configuration with Dual Stacked 242 connectors with USB Type-C 243 connectors that connect and power external displays.

In certain embodiments, the video output 201 can be any type of input such as DVI, HDMI, DisplayPort, Thunderbolt 3 or USB type-C (USB-C), and the video data may pass through a Display Stream Compression (DSC) Circuit allowing for higher refresh rates and more color depth.

In certain embodiments, a USB hub is connected to a number of USB ports that provide overcurrent protected power for a number of local USB ports and that multiplexes the USB signal onto the Network interface through a Network Video Processor, making devices plugged into the Receiver appear to the Host PC, through a Transmitter, as they are connected locally through a USB hub.

In certain embodiments, the Dual LAN Ethernet Port 209 can be implemented by one or more Ethernet LAN ports connected to a hub, and where the Ethernet signals are multiplexed on to the Network through the Network Video Processor, making devices with Ethernet plugged into the Receiver and Transmitter appear as they are connected locally through a hub and appear on the same local network.

In certain embodiments, the Analog and Digital input and output Audio ports, with connections made through standard Audio Jack connectors for Microphone, Headset, Line Audio, SPDIF or standard Motherboard Audio Headers, where Audio devices plugged into the Receiver appear as they are plugged in locally into the Host PC.

In certain embodiments, the signals to and from an Infrared transmitter and receiver plugged into the Receiver, and their signals multiplexed onto the Network through the Network Video Processor, gets respectively received and driven by the receiver, appearing on the Transmitter as if the Infrared devices were connected locally.

In certain embodiments, the power button and reset button of the Receiver connect through the Network Video Processors, and to the power button header of the Transmitter such that when power is on, a push on the Receiver power button causes the power switch on the Host PC to be closed, and a push on the Receiver reset button causes the reset switch on the Host PC to be closed, thus initiating a power down or reset event on the Host PC.

In certain embodiments, if the power button is pushed when the main power is off, a battery connected to a voltage step-up circuit delivers a series of voltage pulses on the Network power conductors that is sensed by a circuit on the Transmitter running from standby power, and that simulates a power switch press to the Host PC, causing the PC to power up as it normally would when the power button is pressed.

In certain embodiments, one or more serial ports connected to a Microcontroller that converts the serial ports to a Virtual Comports and makes them appear on the Host PC as Physical serial ports, through the Network Video Processors connected by the Network.

In certain embodiments, one or more serial ports connected to a Microcontroller on the Receiver that converts the serial ports to Virtual Comports and makes them available on the Transmitter through USB, making them appear as they are physical serial ports connected locally to the PC.

In certain embodiments, an internal power circuit capable of receiving power from conductive wires of the Network connection, isolate the power, so that a substantial voltage difference may be present between the Transmitter and Receiver without causing any harm, and provide some of this power to the Power Jack for use by an external display device, such as a PC monitor.

In certain embodiments, if power is applied to the Power Jack the consumption of power from the Network is discontinued, by turning off power received by the PoE Controller from the Transformer, and the circuitry of the Receiver is then powered entirely by the power supplied from the external power source through the Power Jack.

In certain embodiments, the Video Input is utilized by the Microcontroller to sense the presence of an external Display Device through Hot Plug Detect and the presence of an EDID EEPROM.

In certain embodiments, the Microcontroller has an area of memory where a table of key EDID parameters are stored, such as Display Vendor, Display Type, Display Model number, etc., and where an associated Voltage Level is stored and that Voltage level is to be applied to the Power Jack if the key EDID data matches that of the Display device actually attached.

In certain embodiment, if the attached Display Device's key EDID parameters are not found in the table of known devices, a lowest possible voltage is applied, and then slowly ramped up until video is being sensed as being transmitted to the Display device, at which time the voltage ramping stops, a stable voltage continues to be applied, and the voltage at which the display device was detected is stored in the table along with the key EDID parameters of the attached display device.

In certain embodiment, if the current draw of the attached Display Device suddenly falls to near zero, the voltage applied to the Power Jack is turned off, and the algorithm of detecting the attachment of a Display Device, as described in claim 22, resumes.

In certain embodiment, the Microcontroller senses an adjustment of a potentiometer, and where the voltage applied to the Power Jack is adjusted proportionally in both positive and negative direction according to the adjustment, and where some time after the adjustment has stopped being adjusted, the resulting voltage is stored as the associated voltage in the table for associated voltages for a specific set of key EDID parameters, replacing the previous value that was derived from auto-adjusting the voltage or from previous manual adjustments.

In certain embodiment, the Power Jack is an internal connection to a Controller Board of a Display Device rather than an external monitor, and where the entire Receiver and Display Device are hosted within the same mechanical enclosure.

In certain embodiment, the circuitry of the Receiver and the circuitry of the Display Controller Board are combined together into a single Printed Circuit Board making them indistinguishable as separate products or modules.

In certain embodiments, a number of electrically conductive pins representing the various interfaces of the Receiver, such as video output, USB, Ethernet, Serial Ports, InfraRed Ports, Digital and Analog Audio, Power and Reset signals, as well as Power signals are made available for a secondary Printed Circuit Board Assembly (PCBA) to be temporarily or permanently attached, where the PCBA becomes a module that can be designed or configured to any number or combinations of applications, and hereinafter referred to as the Expansion Board (EB).

In certain embodiments, in the EB, circuitry to convert, clone, split or process the video output from the Receiver into sections is added.

In certain embodiments, in the EB, one or more of the video outputs may be one or more combinations of the following interfaces; HDMI, DVI, DisplayPort, Thunderbolt, or USB Type-C (USB-C), and may include an On Screen Display feature.

In certain embodiments, in the EB, a touchscreen interface, haptic feedback circuit, capacitive in the air touch, or ultrasonic sensors may be added.

In certain embodiments, in the EB, circuitry exists for enabling WiFi router or access point, Wireless Card Reader for Payment Processing (such as ApplePay, SamsungPay, LINEpay, EZ-card, etc), Credit Card Reader, or Wireless Charging, such as Qi from the Wireless Power Consortium (WPC), or any combination thereof.

In certain embodiments, in the EB, circuit and devices are added to facilitate the printing of a paper, photograph or receipt.

In certain embodiments, in the EB, a speech recognition and speech generation circuitry are added to further enhance the usability and application areas of the system.

In certain embodiments, the EB includes interfaces to fingerprint sensors, medical devices, and environmental sensors, such as $CO_2$ sensors, temperature, pollution, and weather sensors.

The receiver 200, which may be powered through the network, then expands the signals back to standard interfaces that are made available through connectors on the receiver. The receiver includes a power output connector 203 where some of the power received over the network 300 can be used to power an external display device, such as a video monitor, video tile, projector or a television. Alternatively, this power connector may be used to power the Receiver, in which case the Power of Ethernet circuitry disables the production of a detection signature on the Network.

The transmitter unit typically comes in the form factor of a PCI express card 100, but may also be designed as a discrete module to be plugged into the motherboard, or its circuitry may be designed into the motherboard itself. In another embodiment, the transmitter may be designed as a baseboard or carrier-board where a computing unit, such as a COM Express or Qseven, is plugged into it. In yet another embodiment the PCI express card may be installed in an external enclosure that powers the card through the PCI express bus gold fingers 116 and the interfaces and their associated connectors are exposed externally either directly or through cables.

The receiver unit typically comes in the form factor of a rectangular printed circuit board 202 mounted in an enclosure that is placed flat on a table under or near a desktop display, or mounted onto the back of the display itself through a bracket, such as a standard VESA 75 mm or 100 mm mount. The display is then connected to the receiver through an HDMI, DisplayPort or USB type-C cable, and the display power connector is connected to the power output port of the receiver. Although the drawing specifically shows an HDMI connector 210, it should be appreciated by anyone skilled in the art that the video signals may be of any numbers of other types, which is easily and typically converted by adding a semiconductor component 815 on the PCBA 202 itself such that another video interface standard can be outputted directly from the card. Analogously it should be appreciated that the number of video and other ports on the one and same PCBA may be more than just one. Specifically, the video signal may be of a single type such as HDMI, DisplayPort or USB Type-C, but the system may include Video Conversion circuits that allows one of more video standards to be provided or available in duplicate formats from the Receiver 200 or as input to the Transmitter 100.

In another embodiment 850 the receiver assembly 200 may be built into the display unit itself, where the display and power outputs are connected internally and where the USB and audio ports are exposed to the operator through the display enclosure. This is equally true for any other display product other than a monitor, such as a TV, smart TV, projector, laser-projector, video tile, LED video wall, or similar systems.

The receiver has an expansion slot 239 including through hole PCB headers. An Expansion Board (EB) 240 has access to all of the powers and major interfaces of the receiver, and exposes those signals through these headers. The EB may host display driver circuitry, backlight driver, control interfaces, and speaker driver circuitry, such that the Receiver PCBA combined with the EB comprises the entire circuitry of a modern display unit, including powered speakers, brightness and contrast controls, volume controls, On Screen Display (OSD) and infrared remote services.

The Expansion Board (EB) concept allows for various configurations of the product to be shipped targeting various use cases and applications. Another type of EB 244 targets applications where the single video stream input is routed to the EB, and where electronic circuitry on the EB splits the single video screen into multiple screens by quadrant. In the embodiment illustrated in FIG. 3D two dual stacked connectors 242 with USB type-C 243 are used as video output and power for the 4 attached displays. Again, one skilled in the art would appreciate that the exact number of ports and the specific type or video standard of the ports may vary while preserving the general spirit of the invention. Specifically, this configuration may also be dynamically be configured to show a copy (or clone) of the input image on all outputs rather than a particular section of it. Other features may be added as well, such as On Screen Display (OSD), bezel correction, image scaling, and other video processing features. Specifically for USB type-C, power for the screens may be made available, but it could also be the case where HDMI or DisplayPort is used and where power is made available through additional power output ports on the EB.

Figure 3D:
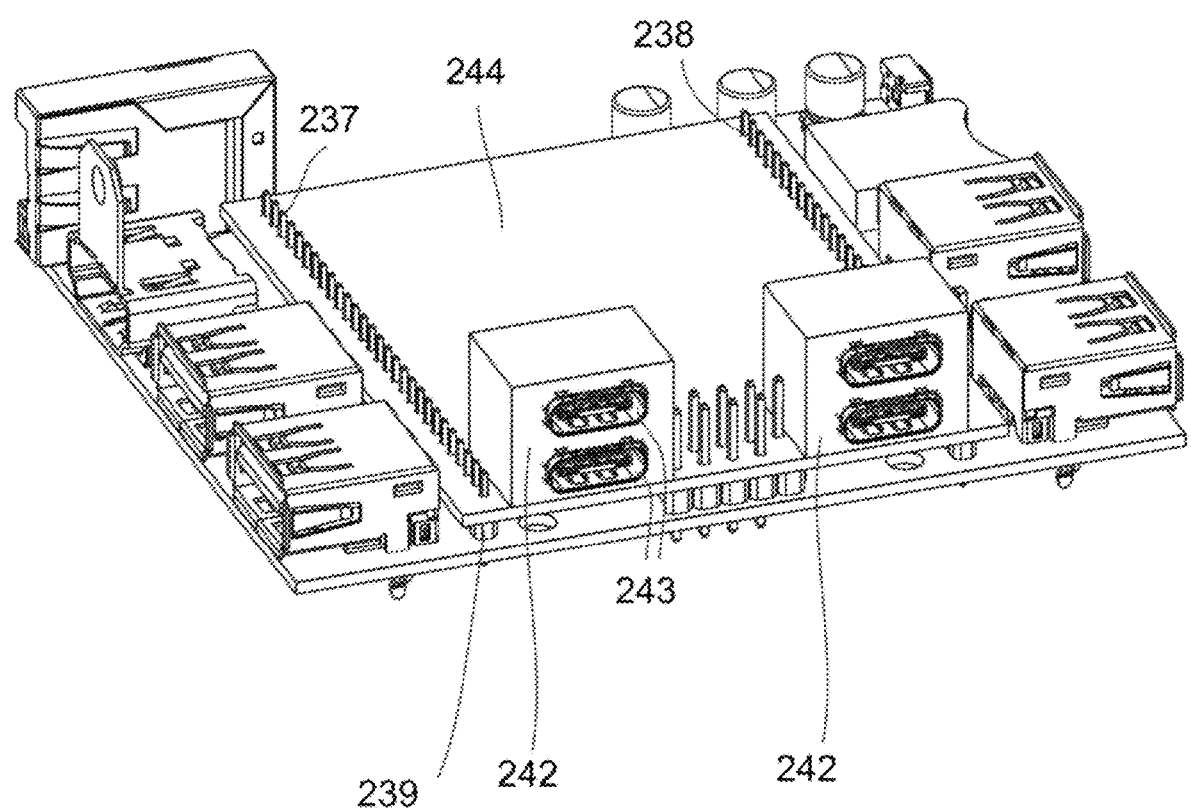
FIG. 3D is a perspective view of the Network Video Receiver 200 of FIG. 3A from a different viewing angle according to one embodiment of the disclosure.
Figure 4:
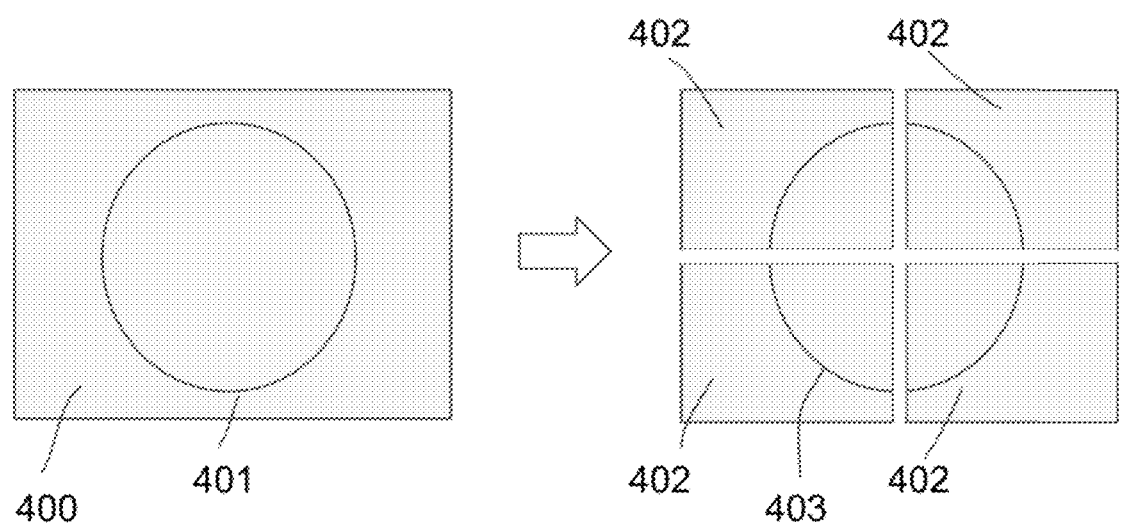
FIG. 4 is a schematic illustration of a typical video input 400 with image 401 and the resulting images 403 on a four video outputs 402 according to one embodiment of the disclosure.

FIG. 4 shows a simplified illustration specifically for the case where a single video input image 400 with a graphical object 401 is converted to 4 quadrant screens 402 using the Expansion Board 244 illustrated in FIG. 3D, where the input image is split up into four sections, called quadrants, and each displayed on individual displays or monitors. The image 403 appears as a section on each quadrant screen 402. It should be noted that the number of screens 402 after the conversion are not limited to 4, nor should the individual screens 402 have to be of the same size.

Other popular applications for the EB that may be design in as discrete features or combined together are; WiFi router or access point, Wireless Card Reader for Payment Processing (such as ApplePay, SamsungPay, LINEpay, EZ-card, etc), Credit Card Reader, or Wireless Charging, such as Qi from the Wireless Power Consortium (WPC).

The network ports that connect the transmitter 104 and the receiver 208 typically uses Category 5 or 6 twisted pair cable, of the type that is used in 10/100 Gigabit or 10Gig Ethernet applications.

The signaling protocol that is used on either the twisted pairs of the copper cable or the optical cable is typically either HDBaseT, HDBaseT-IP, SDVoE, AV-over-IP or simply just standard 10/100 or 1G or 10G Ethernet.

Alternatively, a fiber optical cable, also of the type that is used in optical Ethernet applications. When an optical cable is used, power may be carried on additional copper wires that run parallel with the optical cable. FIG. 5 shows various configurations of optical fiber with power connections.

Figure 5A:
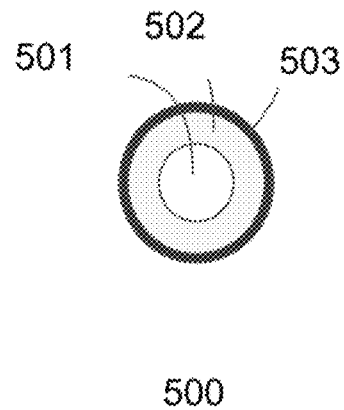
FIG. 5A shows a simple Fiber Optic cable according to one embodiment of the disclosure.
Figure 5B:
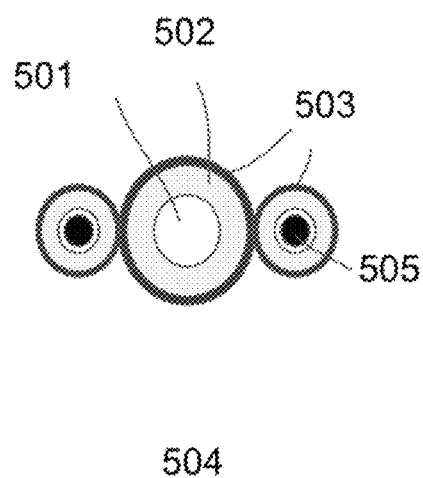
FIG. 5B shows a Fiber Optic cable with 2 power conductors according to one embodiment of the disclosure.
Figure 5C:
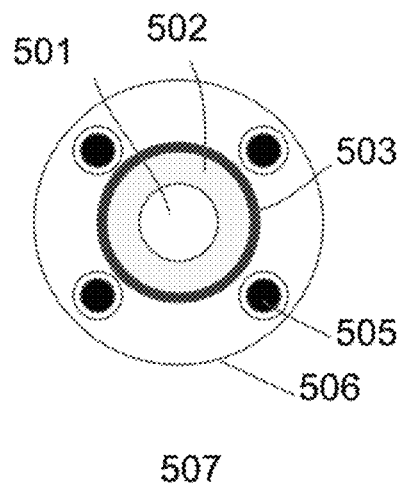
FIG. 5C shows a Fiber Optic cable with 4 power conductors according to one embodiment of the disclosure.
Figure 5D:
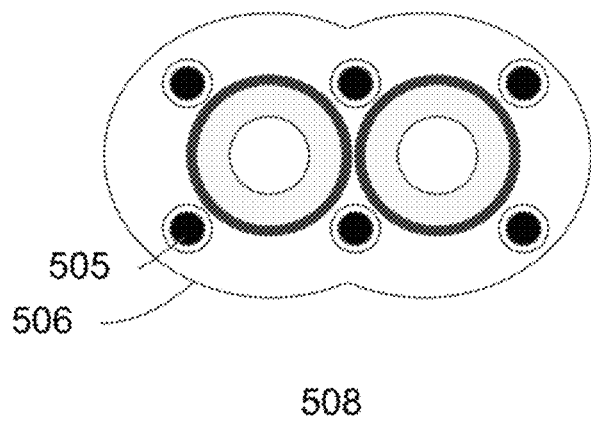
FIG. 5D shows a dual Fiber Optic cable with n power conductors according to one embodiment of the disclosure.

FIGS. 5A through 5D shows various implementations of Fiber Optic cable, where FIG. 5A shows a simple basic cable, and FIG. 5B shows the basic cable with two electrical conductors for power. FIG. 5C shows a single Fiber Optical cable with 4 electrical power conductors, and lastly FIG. 5D shows two Fiber Optical Cables affixed within one cable envelope that also contains a multitude of electrical conductors for power. Light conductors 501, cable material 502, and protective jackets 503 are shown along with copper conductors 505, and outer protective jackets 506. Figures show a single fiber optic cable 500, a single conductor with dual copper conductors, 504, a single fiber optic connection with 4 power conductors 507 and finally more than one fiber optic cable with multiple copper conductors encompassed within a single protective jacket 508.

FIG. 5A shows a typical optical fiber 500 is constructed with a light carrying element 501, a shield or barrier 502, and an outside protective layer 503, which is usually plastic. FIG. 5B shows the same fiber but with two conductive wires 505 affixed alongside the fiber. FIG. 5C shows a configuration with 4 conductive wires. Finally, FIG. 5D shows a combination of two fiber optic cables with 6 electrically conductive wires. This last application can be used to carry either two payloads in the same direction or equal payloads in either direction.

FIGS. 6A and 6B shows a block diagram of the power flow of two different embodiments of the Network Video Transmitter, whereas FIG. 6A shows a Wired Network connection and FIG. 6B shows an Optical Network connection. The typical flow starts with a power supply 600, a power input connector 601, an isolated power step up converter 602, a power over ethernet controller, for Power Sourcing Equipment (PSE) 603, a network PHY 604, a Transformer 105 and connector 104 for wired ethernet, or in the case of optical networks an optical transceiver 605 and optical connector 606.

FIGS. 7A and 7B shows a block diagram of the power flow of two different embodiments of the Network Video Receiver, whereas FIG. 7A shows a Wired Network connection and FIG. 6B shows an Optical Network connection. The typical flow starts with the data and power being received either through a wired 208 or optical 704 connector. The signals are then passed through a Transformer 245 and rectifier bridge 700 in the case of Wired Ethernet or a series of rectifier diodes 705. Next, the power reaches a Power over Ethernet (PoE) Powered Device (PD) controller 701, before it gets distributed to Internal Board Power 703 and External Display Power 203. A set of Rectifier Diodes 706 and voltage feedback Allows the product to be powered through the external Power Connector 203, in which case the PoE-PD controller 701 turns off, and Board Power 703 is provided through 203 rather than 701.

The transmitter that is typically in the form factor of a PCI express card is powered from the ATX power supply 802 within the PC or a power supply external to the PC. The power is then converted within circuitry on the transmitter from the power supply a voltage of typically 48-56V. This voltage is applied to the network cable through a Power over Ethernet (PoE) integrated circuit controller that checks for a valid device signature on the cable. The current standard for PoE is IEEE 802.3at but is also referred to as POE+, POE++ or UltraPower, since it is capable of delivering higher power to than the traditional plain PoE standard.

The receiver unit for graphics, control signals, USB, and audio is connected through a network to a video transmitter connected to a Network Video Receiver unit with a graphics transmitter through a single Ethernet/LAN cable is hereinafter disclosed. Power Over Ethernet (POE) compatible power is provided on the same cable, and typically supplied by the unit connected to the video source, and consumed by the video destination. In addition, Ethernet, USB, RS-232, I2C, Infrared and Control Signals are carried across the single Ethernet/LAN cable and received and transmitted by the units on either side depending on the signal type and desired direction of flow.

Figure 8A:
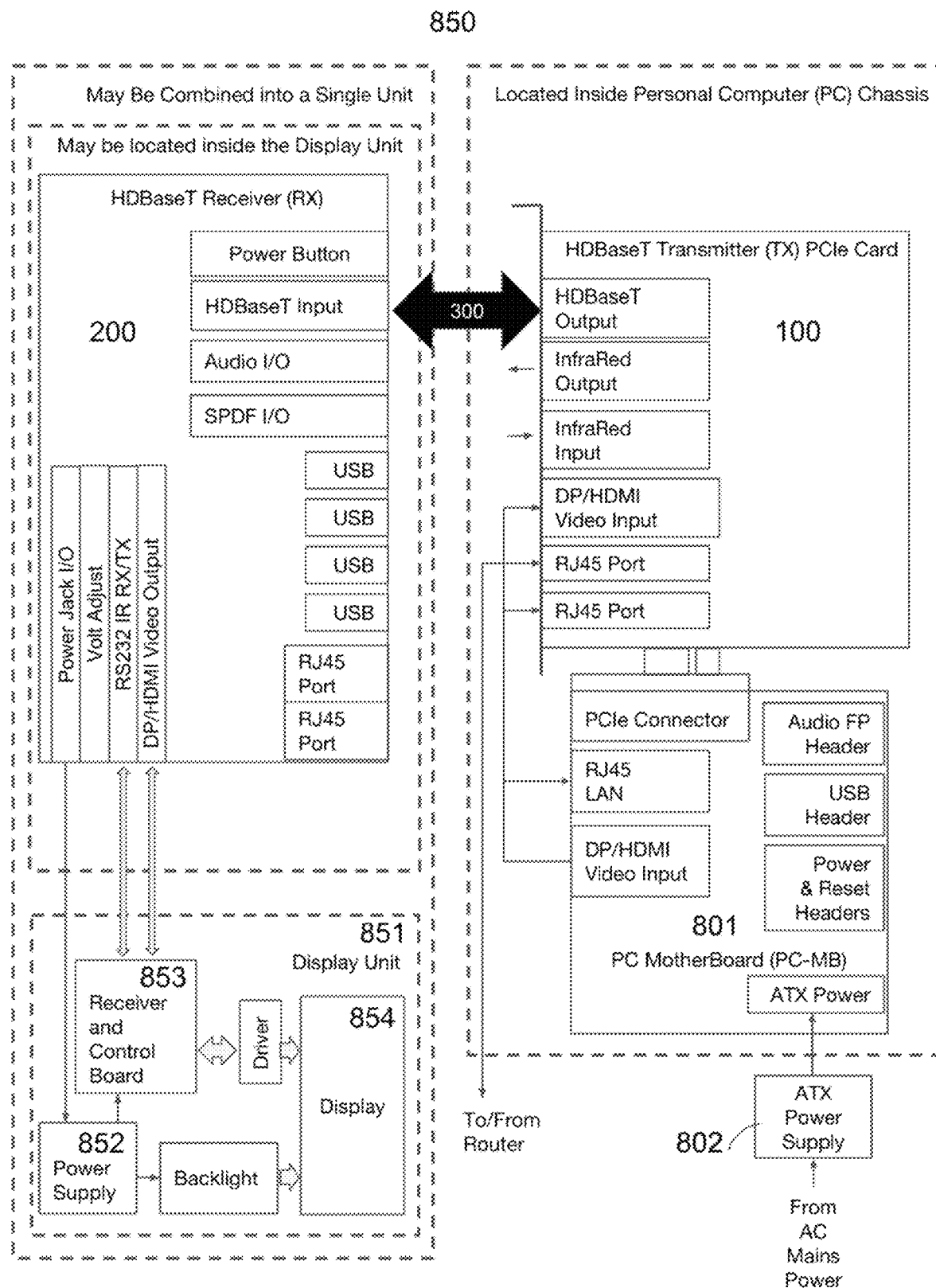
FIG. 8A is a block diagram showing the main interconnection between the Network Video Transmitter 100 and Receiver 200 according to certain embodiments of the disclosure.
Figure 8B:
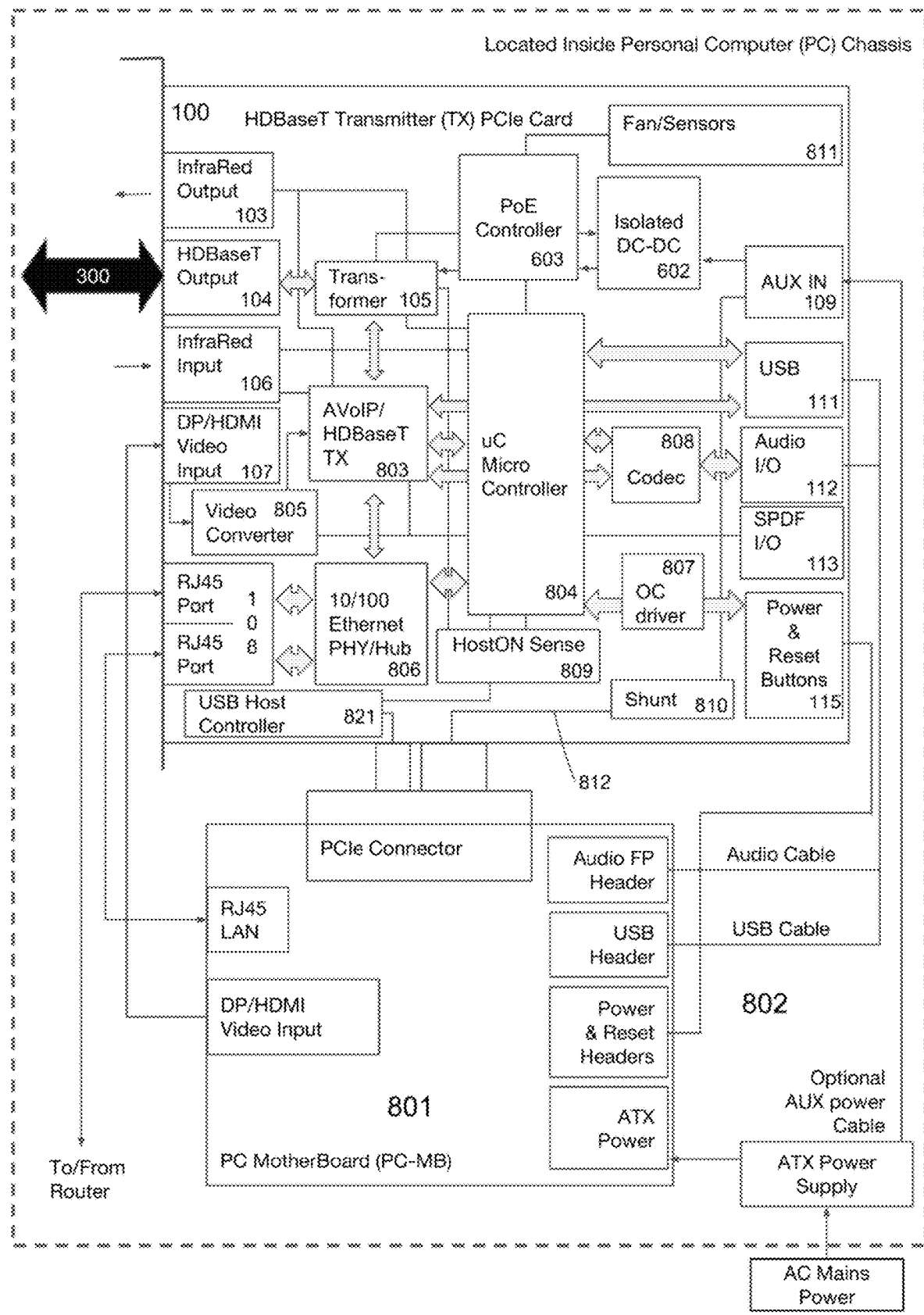
FIG. 8B shows a block diagram of the Network Video Transmitter 100 according to certain embodiments of the disclosure.
Figure 8C:
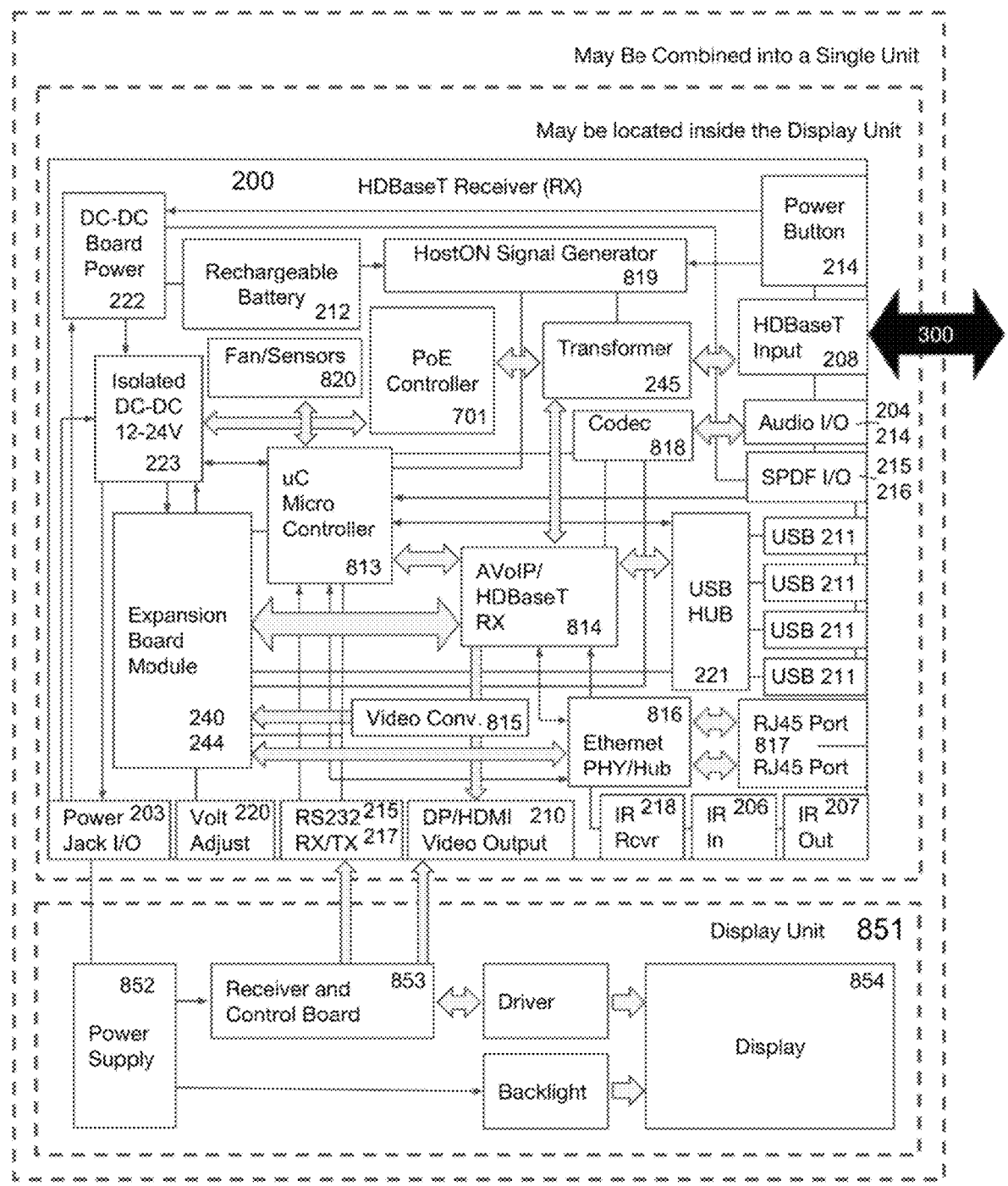
FIG. 8C shows a block diagram of the Network Video Receiver 200 according to certain embodiments of the disclosure.

FIG. 8A shows a top level overview of the main interconnects in the form of a block diagram between the Network Video Transmitter 100 and Receiver 200, in a typical embodiment where the Transmitter 100 is plugged into a motherboard 801 and powered by a power supply 802. FIGS. 8B and 8C shows more detailed block diagrams of the Network Video Transmitter 100 and Receiver respectively 200. The Network Video Receiver 200 may in one embodiment be located within an all-encompassing enclosure 850, and connected internally to a Display Unit 851 that has an internal Power Supply Unit 852, a Receiver and Control Board 853, and a Display 854.

FIG. 8B shows a typical block diagram of the Network Video Transmitter 100, centered around the Transmitter System Microcontroller (uC) 804 and the main Network Video Processor (AVoIP/HDBaseT TX) 803 and that connects to the External Receiver 200 through a Transformer 105 and Connector 104. A multitude of interfaces are then connected within the system to facilitate the desired operation of the invention, such as an InfraRed (IR) Output Port 103, for connection to external IR LED, IR Input Port 106, that connects to an external IR Receiver. Video signal is received from an external video source through an HDMI, DisplayPort, Thunderbolt, or USB Type-C type video interface 107 (with HDMI exemplarily show in the illustration), and may be processed by a Video Converter 805 before reaching the Network Video Processor 803. An Ethernet Hub 806 allows LAN connections from two local network devices to reach the remote network ports through the Main Network Interface 104. An Open Collector (OC) Driver 807 drives both power pins of the Power & Reset Buttons 115 low, so that the power state of the host can be controlled and main CPU reset. An Audio CODEC 808 allows the local analog interfaces to send and receive digital audio to and from the remote receiver 200 through the controller 803. The HostOn Sense 809 is a circuit that is powered from Standby Power and listens on the network for a power pulse train to indicate that a remote receiver wishes to power up the Host PC, as described in FIG. 9. The Shunt 810 is a jumper that allows the PCI card to receive 12V power from the PCI-bus PCIe connector 812 in a system where an AUX power connector is not available. Lastly a Fan and Tachometer Fan sensor connector 811 is shown that allows the uC 804 to control a Fan and monitor its presence, operation and speed.

FIG. 8C shows a block diagram of the Network Video Receiver 200, centered around the Receiver System Microcontroller (uC) 813 and the main Network Video Processor (AVoIP/HDBaseT RX) 814 and that connects to the External Transmitter 100 through a Transformer 245 and Connector 208. A multitude of interfaces are then connected within the system to facilitate the desired operation of the invention, such as an InfraRed (IR) Output Port 207, for connection to external IR LED, Infrared Input Port 206, that connects to an external IR Receiver, and a built in IR receiver 281 that is disabled if 206 is plugged in. Video is transmitted through an HDMI, DisplayPort or USB Type-C type video interface 210 (with HDMI exemplarily show in the illustration), and may be processed by a Video Converter 815 and splitter before reaching 210. The video is also split or made available through to the 240 or 244 Expansion Board Module. An Ethernet Hub 816 allows LAN connections from two local network devices to reach the remote network ports through the Main Network Interface 817. An Audio CODEC 818 allows the local analog interfaces to send and receive digital audio to and from the remote Transmitter 100 through the controller 814. These audio signals are then available through the analog Audio I/O connectors 204, 214, and SPDIF digital audio connectors 215 and 216. The HostOn Signal Generator 819 is a circuit that is powered by the rechargeable battery 212 and provides a pulse train on the network power lines to indicate from and unpowered Receiver to a Transmitter in Standby Mode that the user has pushed the power button 214 and wishes to power up the Host PC, as described in FIG. 9. Lastly a Fan and Tachometer Fan sensor connector 820 is shown that allows the uC 813 to control a Fan and monitor its presence, operation and speed. An onboard USB Hub 221 connects multiple USB ports 211 as well as the header 230 to the Main Processor 214, which in turn makes these USB connections virtually available on the Transmitter side USB port 111, and thus it appears to a user that USB devices connected to the Receiver appears on the local PC just as if they were connected locally to the PC. An optional USB PCIe Host Controller 821 connects the USB signals from the uC to the Host PC, so that devices plugged into the Receiver appears to be connected to the local PC without having to install a USB cable from the USB header 111 to the Motherboard. Power to operate the Receiver 200 may come through the Network through the Cable 300 and be made available on the Power Jack IO to an external display through a set of transformers 110 and DC-DC isolation circuitry 223 or may come from the same power connector 203, in which case the PoE-PD controller will shut down its power received from the Network.

In one embodiment, the Receiver may operate as a stand-alone unit such as shown in FIGS. 3A and 3B, or it may be built in to a display 850, where the circuitry for the display may be implemented on a module 851 on built into the Expansion Board Module 240 as illustrated in FIG. 3C.

Note that PoE specifically when used with HDBaseT Transmitters and Receivers are often referred to as PoH (Power over HDBaseT). It should be understood throughout the teaching of this invention that PoE and PoH may be used interchangeable.

A receiver unit for graphics and control signals containing a Network Video Transmitter unit in the form of a PCI express card is disclosed. The control signals include a multitude of interfaces, such as USB, Ethernet, RS-232, I2C, Infrared and POE compatible power that are all combined onto a single Ethernet or LAN type Network cable.

When used internally to a PC as a PCI express card, the POE power comes from the Auxiliary ATX PC power supply cable. When used externally in an enclosure, the power for the card itself and POE comes from an external power supply.

The invention disclosed hereinafter is located within or in the vicinity of a content source, such as a PC or Embedded Video Player, and is considered as the "Power Capable Network Video Transmitter" (PCNVTx). It combines all of the supported signals with power onto a single network cable.

A matching "Power Capable Network Video Receiver" (PCNVRx) is located in the far end of the Networked Display System (NDS), which is capable of extracting power from the network cable, and use it to supply its own circuitry as well as powering the display unit itself.

Just as the PCNVTx may or may not be located within the PC or Embedded Video Player, the Receiver may or may not be located within the same physical enclosure as the display.

Figure 9:
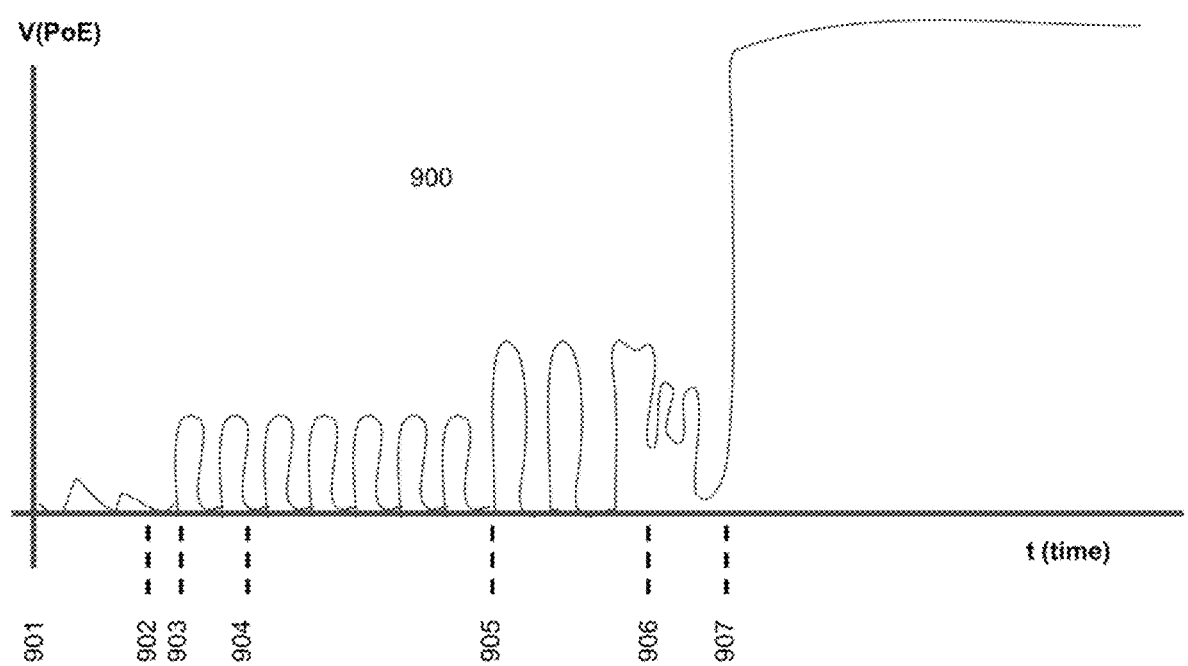
FIG. 9 shows a power signal exchange between a Networked Transmitter/Receiver pair according to certain embodiments of the disclosure.

FIG. 9 shows a typical power signal exchange between a Networked Transmitter/Receiver pair, with the key events pointed out on the time scale. Specifically, the curves in FIG. 9 shows the power on sequence when the power button on the receiver is pressed. At time 901 (where t=0), the power is OFF. At time 902, the User pushes the power button on the receiver. At time 903, in response to the power button being pressed, a plurality of wakeup pulses generated from the battery on the Receiver are sent to the Transmitter. At time 904, the Transmitter detects the pulses being transmitted from the Receiver, and brings PC out of standby power mode. At time 905, PoE-PSE starts detecting for a PoE-PD Receiver. At time 906, PoE signature is given by Receiver. At time 907, the Transmitter turns on PoE power.

Figure 10A:
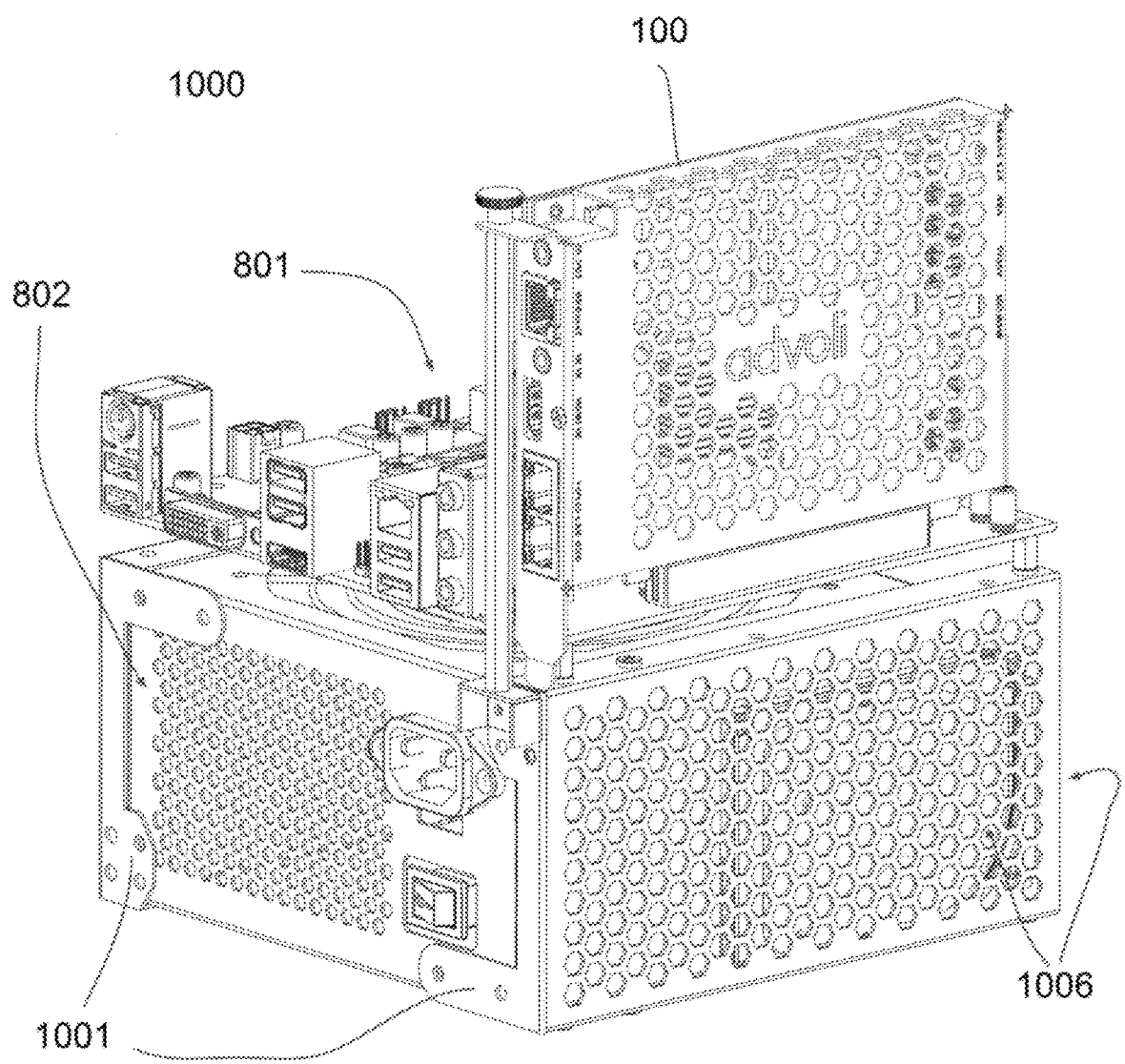
FIG. 10A shows a Minimalist Chassis System 1000 according to certain embodiments of the disclosure.
Figure 10B:
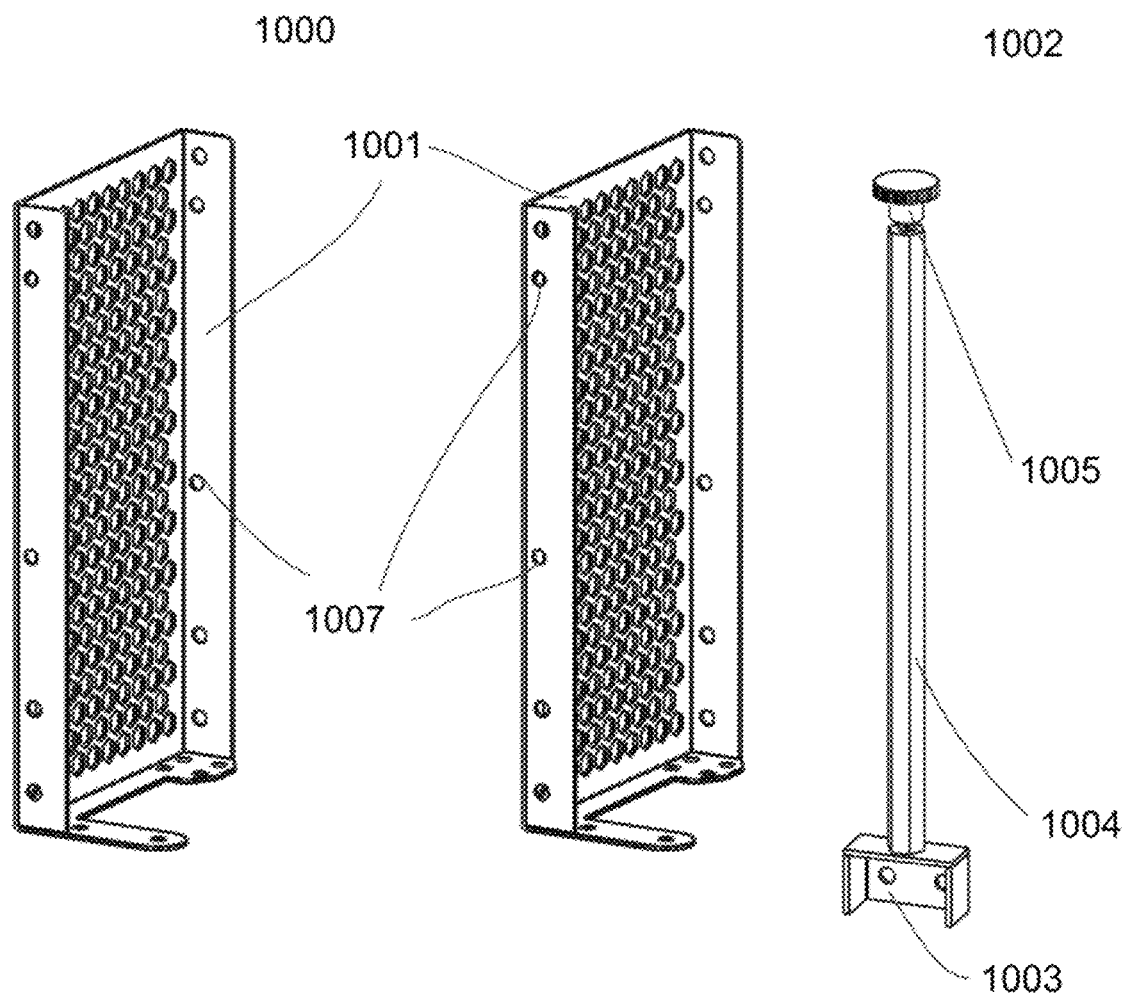
FIG. 10B shows the main components of the Minimalist Chassis System 1000 according to certain embodiments of the disclosure.

FIGS. 10A and 10B show a Minimalist Chassis System 1000 and the main components thereof. As shown in FIG. 10A, the Minimalist Chassis System 1000 is provided using the smallest number of components necessary, to mount the Network Video Transmitter 100 into a PC Motherboard 801 and placed on top of the ATX PC power supply 802 with a Hard Disk Drive 1006. The main components of the Minimalist Chassis System 1000 as shown in FIG. 10B include two brackets 1001 with mounting screw holes 1007 for Hard Disk Drives 1006, such as Solid State Disks (SSDs), and a Card Mounting Rod Assembly 1002, including a Rod Mount 1003, a Threaded Rod 1004, and a Thumb Screw 1005.

Figure 11A:
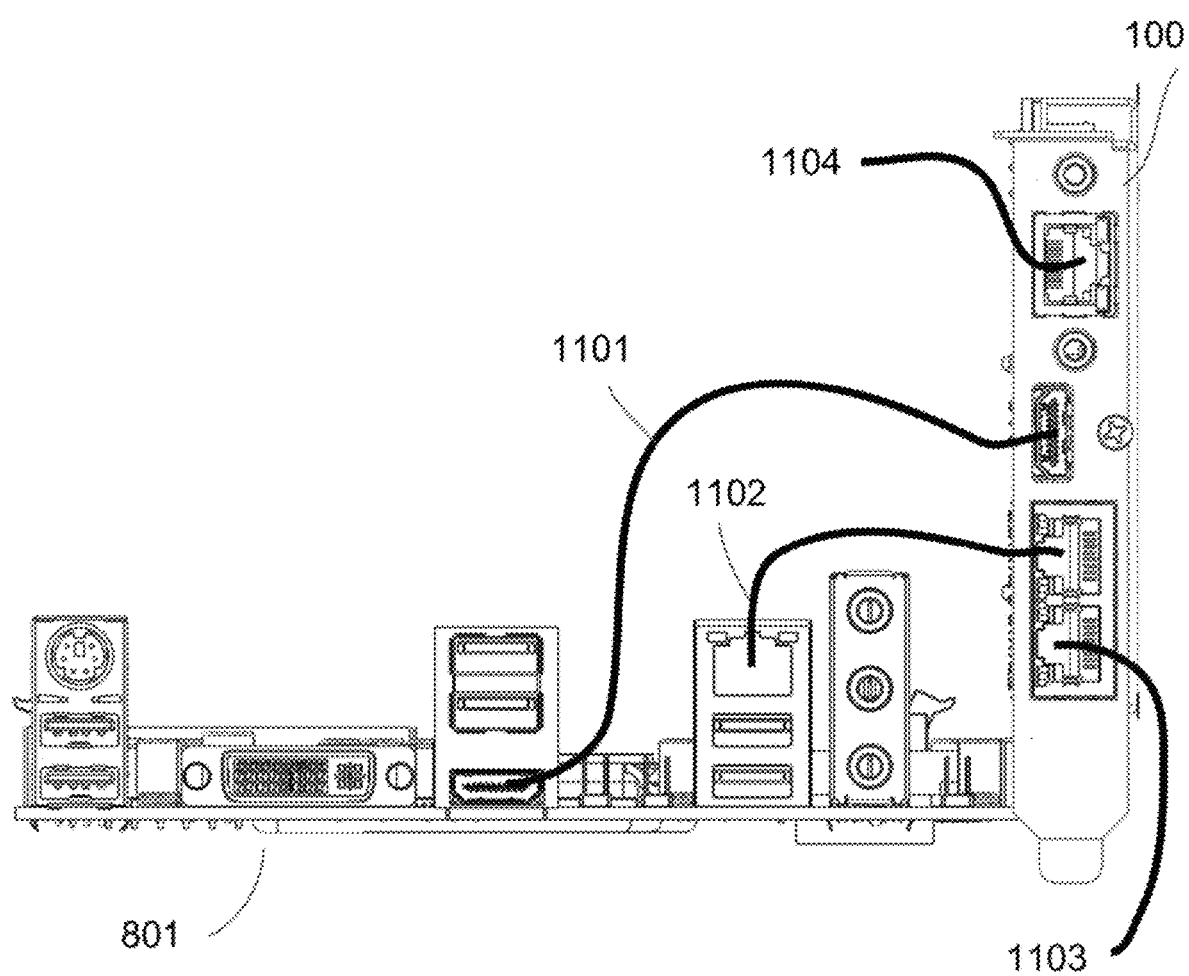
FIG. 11A shows a front view of the interconnection between the Network Video Transmitter 100 and a Motherboard 801 according to certain embodiments of the disclosure.
Figure 11B:
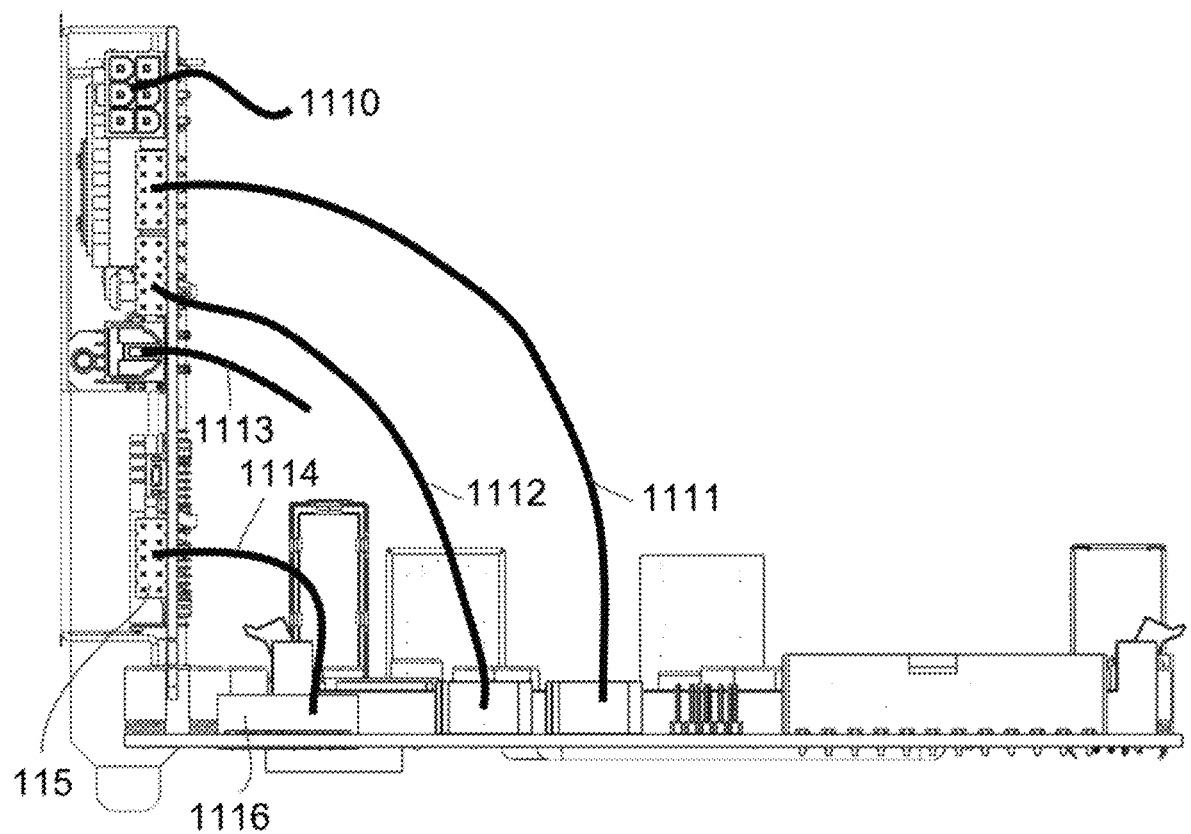
FIG. 11B shows a rear view of the interconnection between the Network Video Transmitter 100 and a Motherboard 801 according to certain embodiments of the disclosure.

FIGS. 11A and 11B shows the typical interconnects between the Network Video Transmitter 100, and a Motherboard 801. FIG. 11A shows the Front View and typical external connections, which are HDMI 1101, LAN to Motherboard 1102, and LAN to Router 1103, and the connection between the Transmitter and Receiver 1104. FIG. 11B shows the Rear view with typical internal connections, which are Power Input 1110 from the ATX Power Supply 802, USB Cable 1111 with one or more internal USB channels, Audio Front Panel Cable 1112, that carries microphone, headphones, and speaker signals, SPDIF Audio in and out 1113 for digital audio, and Power and Reset Control Cables with headers 1114, that connect to the Motherboard power on and reset jumper headers so that the PCI card can control the power state of the Motherboard and reset the system. The header 115 can both connect to the motherboard and can also receive connection from the power and reset switches from the PC front panel 1116, so that the system can be reset and power controlled both my buttons and remotely.

Figure 12A:
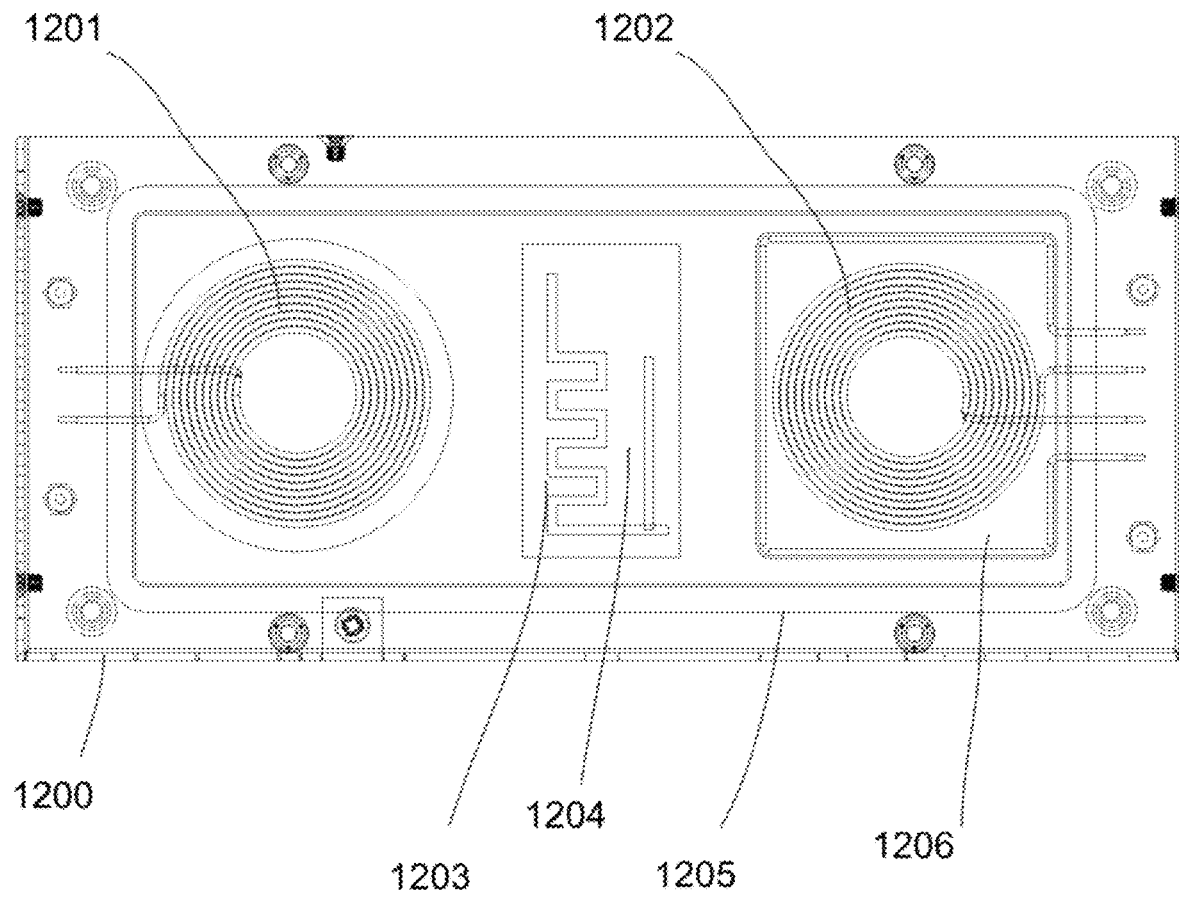
FIG. 12A shows a transparent top view of a product 1200 according to certain embodiments of the disclosure.
Figure 12B:
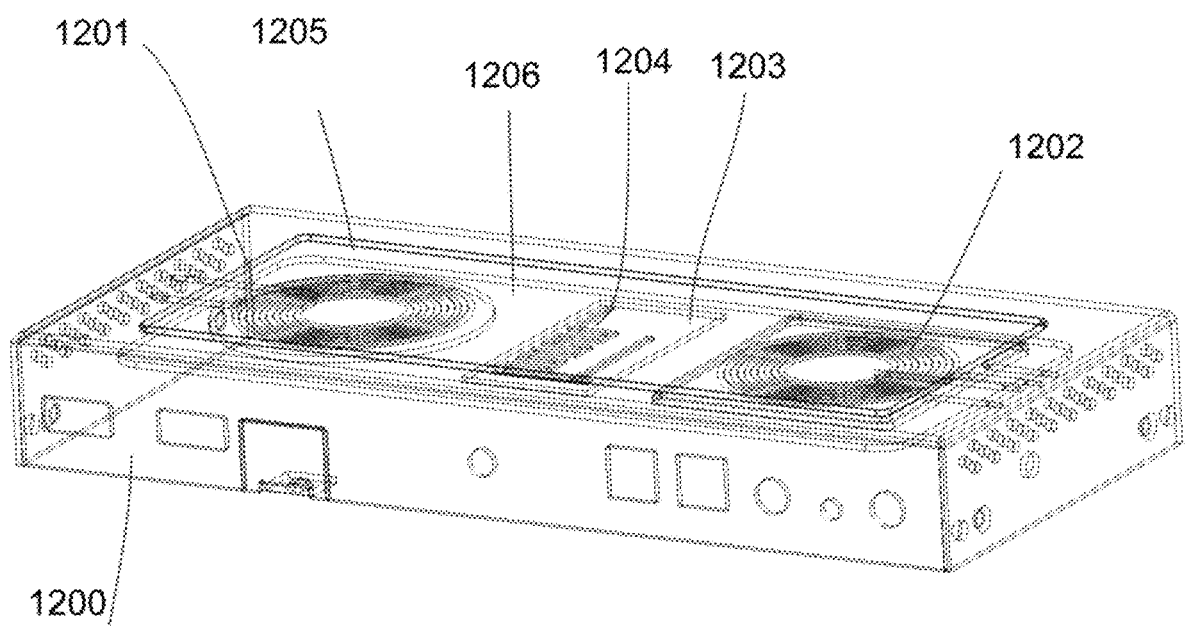
FIG. 12B shows a transparent isometric view of the product 1200 according to certain embodiments of the disclosure.

FIG. 12A shows a Transparent Top View of the product 1200, with a version of the product that connects additional devices to the Expansion Board 240 that hosts Wireless a Charging Coil 1201 for contactless charging, a Charging NFC combination coil 1202 for contactless payment processing, and a Wireless Network module 1203 with a WiFi Antenna 1204, that can enable the product as a WiFi access point. FIG. 12B shows a Transparent Isometric View of the product 1200, where a recess in the enclosure 1205, allows a module holder board 1206, to contain the devices described in FIG. 12A. Connections or cables to the Expansion is not shown for clarity of illustration.

Figure 13:
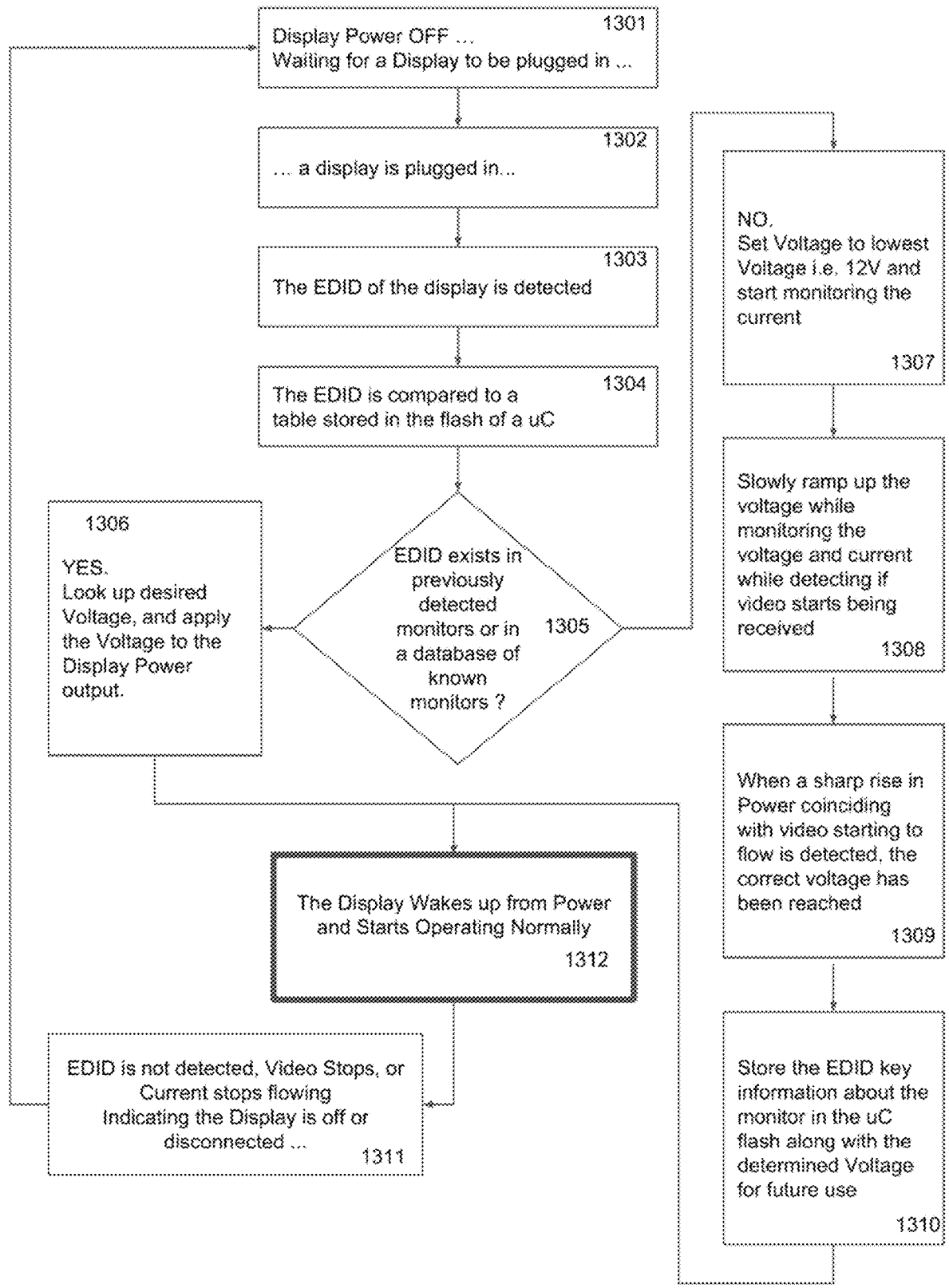
FIG. 13 shows a flowchart that illustrates an algorithm in which a monitor is powered safely by the Network Video Receiver.

In the embodiment where the Receiver 200 is implemented as standalone unit as shown in FIG. 1, this invention teaches a method where a display, projector or similar device is located substantially within the vicinity of the Receiver, and where it receives its power input from the Power Output of the Receiver through connector 203. Different displays require different voltage input and it would not be practical for a user to have to configure the voltage for a particular type of display. Also, it could prove unsafe to apply an incorrect voltage, particularly that of a higher voltage than the display is rated for. Displays with a DC voltage input typically receives a voltage between 12V and 24V DC. This invention teaches a method for auto adjusting of the voltage while sensing the operation state of the display as illustrated in the flow chart in FIG. 13, which illustrates the algorithm in which any monitor can be powered safely by the Network Video Receiver.

This method is substantially implemented as firmware in the uC 813 of the Receiver 100 as a state machine, where in the beginning the Display power on power connector 203 is OFF at block 1301, and the uC is listening for a Display to be plugged in by sampling the I2C or SMBus lines of the EDID pins available on all major display interfaces. When a Display is plugged in at block 1302, the EDID EEPROM is powered by nominal 5V power delivered through the HDMI or DisplayPort interface 210, and the presence is read by the HotPlug Detect pin as well as the presence of the EEPROM through reading the data at block 1303. Key fields of the EDID such as manufacturer ID, product code, display type, etc. is read and compared against a table stored in the EEPROM of the uC at block 1304. This table stores both a list of known monitors as well as a dynamically added list of added monitors after successful detections. If the EDID already exist in the list at block 1305, the uC will configure the correct voltage for that display and enable the power output at block 1306, after which the display will power up and start operating normally at block 1312. If however the display's EDID is not found in the list at block 1307, the uC will turn on the lowest voltage, typically 12V, and start ramping the voltage up very slowly at block 1308, while monitoring the video stream for activity and monitoring the current power connector for a sudden sharp rise, indicating that the display has received enough power to start receiving and displaying video at block 1309. At this time, the voltage is not ramped up anymore, and the EDID of the detected monitor is stored in the uC along with the voltage at which the unit was detected operating correctly at block 1310. After this, the display continues to operate normally at block 1312 until EDID is no longer detected, hotplug detect goes inactive, and the current drops at block 1311, at which time the power is turned OFF and the detection starts over again at block 1301.

Some displays may accept a large range in Voltage inputs, and there may be cases where particular features within the display will not work until a particular voltage threshold has been reached while the main display function operates normally. Since the power consumed by the display should theoretically remain the same for a range of voltage inputs, there may be cases where the detected voltage at which the display starts operating normally at is lower than desired. In the aforementioned cases as well as in any number other cases, there may be situations where the voltage is desired to be controlled explicitly by an operator and fixed at a particular level. A mechanical potentiometer 220 is provided through the chassis and operable by a screwdriver through a hole in the chassis, where the voltage may be tuned higher or lower manually. In such cases, the uC detects the variation in the voltage across the potentiometer and adjusts the voltage on the display power connector up and down as the user manually rotates the potentiometer. The user will typically use an external voltmeter while performing this adjustment. When the desired voltage output has been reached, the user will naturally stop adjusting the potentiometer from some time, and at this point the uC will store the adjusted-to-value as the new value to be used when a corresponding EDID is detected, and use that stored voltage for subsequent detections of displays with corresponding EDIDs.

In a system where a PC is located far or at a distance away from a user, for practical reasons, for security reasons, for audio or electromagnetic noise reasons, or for reasons simply of convenience or desire, it becomes desired for a user or operator to switch off power to the system, which means turning the PC off by means through an OS power function, or through a physical power button 214. A system designer will appreciate that this merely requires that the signal of the power button be transmitted across the network and presented to the motherboard as Open Collector 807 shorts to ground of the Power & Reset headers 115.

When the system is turned off and the user wishes to turn the system on however, a system designer will find it a far less trivial task to solve. This invention teaches a method where a small battery 212 is continuously charged during normal operation, and when the Network Receiver 200 is in the OFF state and the user pushes the Power Button 214, a circuit using battery power steps up the battery power and generates a pulse train that is exposed on to the power wires of the Network Power Cables for an Optical Network Connection or across the common mode of the wires in a wired Ethernet application. Exemplary circuits that facilitates this is shown in FIGS. 14A and 14B, although it should be understood that the exact and specific circuit and components used may be designed and configured in any variety of ways to solve this problem, and it should be appreciated by anyone skilled in the art or electronic design that a variation in the circuit shown should be considered as a similar solution to solving this problem, and the novelty and the spirit of this invention should be appreciated.

Figure 14A:
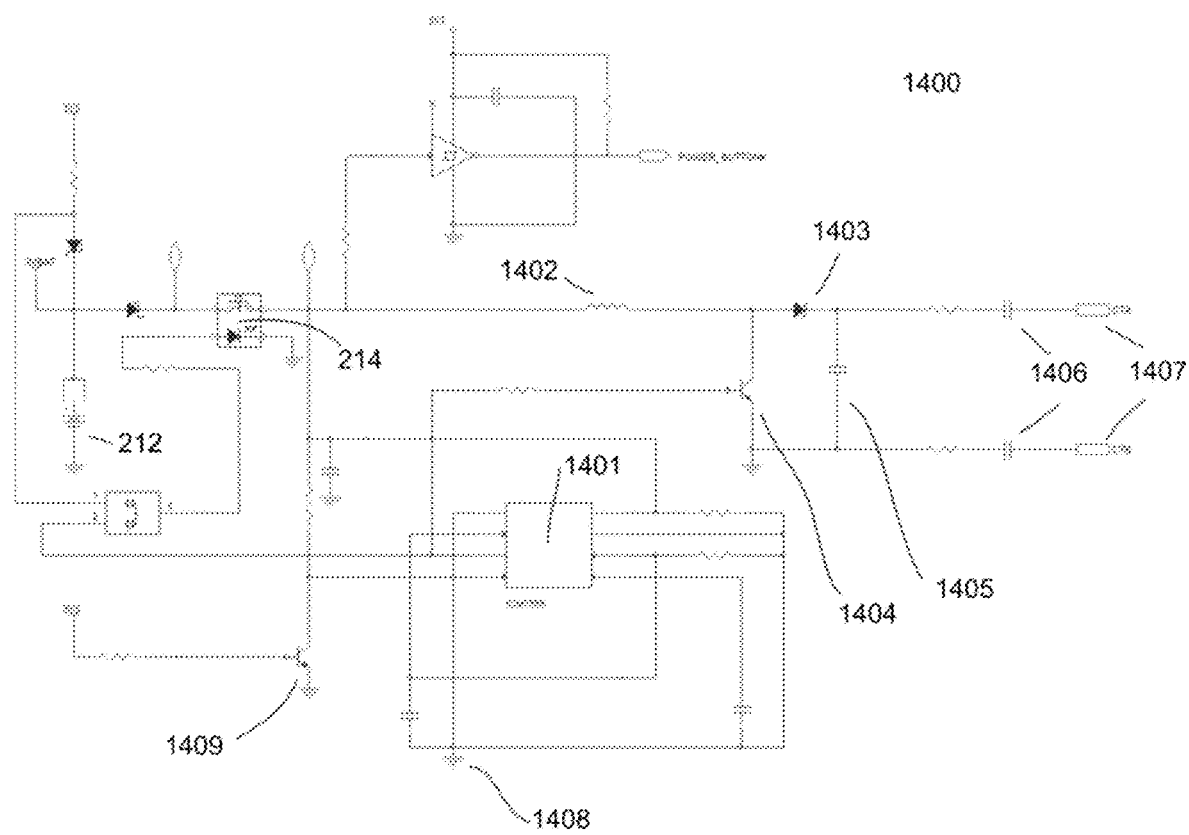
FIG. 14A shows a Pulse Train Generator located on the Receiver 200 according to certain embodiments of the disclosure.
Figure 14B:
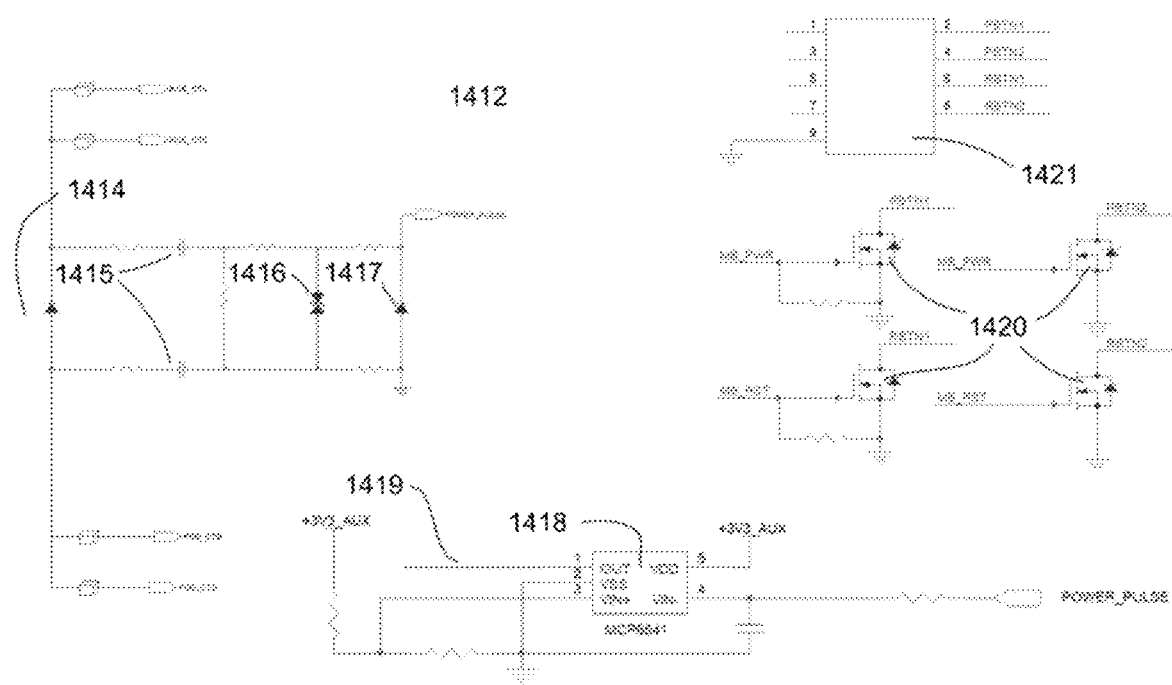
FIG. 14B shows a Pulse Train Receiver located on the Transmitter 100 according to certain embodiments of the disclosure.

FIGS. 14A and 14B show respectively the Pulse Train Generator located on the Receiver 100 and the Pulse Train Receiver located on the Transmitter 100. As shown in FIG. 14A, the circuit 1400 shows a power button 214, that when pushed provides battery power from battery 212 to a pulse generator chip 1401, that creates a continuous pulse train as shown in FIG. 9 steps 2 and 3. The pulse train is generated by switching the power to transistor 1404 which temporarily shows the inductor 1402 to ground 1408, which builds up the current in the inductor. When the transistor releases the assertion to ground, the magnetic power in the inductor is converted to a voltage, which is then transmitted across diode 1403, which also protects the circuit behind the inductor, and charges up the capacitor 1405, which in turn then creates a voltage differential across the capacitors 1406, which also isolates the low voltage circuit from the voltage on the primary side of the Ethernet Transformer 245, shown through terminals 1407, with the resulting voltage differential being delivered across the network cable 300.

In the event the power is already on and delivered to the Receiver 200 from the Transmitter 100, could cause interference and disturbance for the pulse train to be inserted, so in this case Transistor 1409 prevents any pulses from being generated while the system is receiving power. In the even the system is already powered, pressing the switch by an operator results in a logic signal 1419 which goes to the Microcontroller (uC) 813 and initiates a power shutdown pulse to the Host PC through the Network interface 300.

As shown in FIG. 14B, located in the Transmitter 100, the Circuit 1412 listens on the center taps of the primary side of the Transformer 105 with protection diode 1414, as the pulse train propagates across the isolating capacitors 1415, and with over voltage protection through ESD diode 1416, and gets reduced to logic level by diode 1417, and received by a comparator 1418 and delivered to the Microcontroller (uC) 804 through the signal 1419. The uC then turns on the system through Open Collector (or Open Drain) transistors 1420, which drives the power and reset signals to the PC motherboard through header 115 shown in the schematic of FIG. 14B as 1421. Because there are two transistors for each of the two signals power and reset, the user may plug the cable header jumper into 1421 in either order, and the circuit will still work, since on the motherboard one of the pins of the power and reset pin will be ground. Also with this method, the user can plug in any number of other connectors in parallel that goes to other power and reset switches in or on the PC and they will all work in parallel.

The Microcontroller can sense that the power and reset buttons have been pressed, so that an event or log entry can be created, and so that an action can be taken, since it is next likely that the PC will lose its power soon if the power button is sensed to have been pressed.

Figure 15:
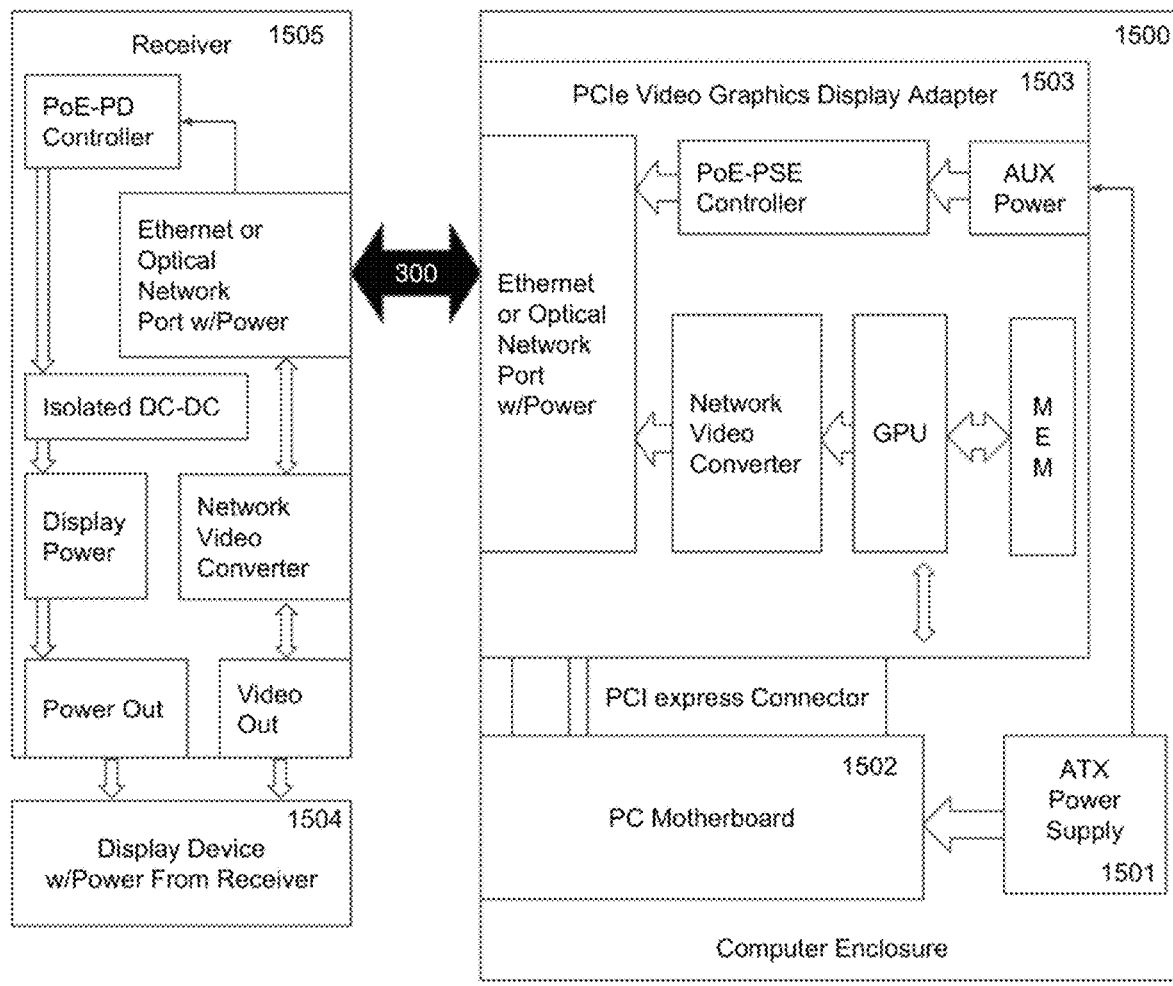
FIG. 15 shows a System Connection Diagram of a Computer Enclosure 1500, a Receiver 1505 and a Display 1504 according to certain embodiments of the disclosure, where the Display 1504 is powered by the Receiver 1505.

FIG. 15 shows a Simplified System Connection Diagram where a Computer Enclosure 1500 comprising an ATX power Supply 1501 powers a PC Motherboard 1502 and a PCI express (PCIe) Video Card or Video Graphics Display Adapter 1503, and where a Display 1504 is powered by a Receiver 1505 through a Network Cable with Power 300. This Figure emphasizes that the Network Video Adapter 1503 does not need to be a discrete Transmitter as described before, but may be an actual Graphics Card with Graphics processing capability.

Figure 16:
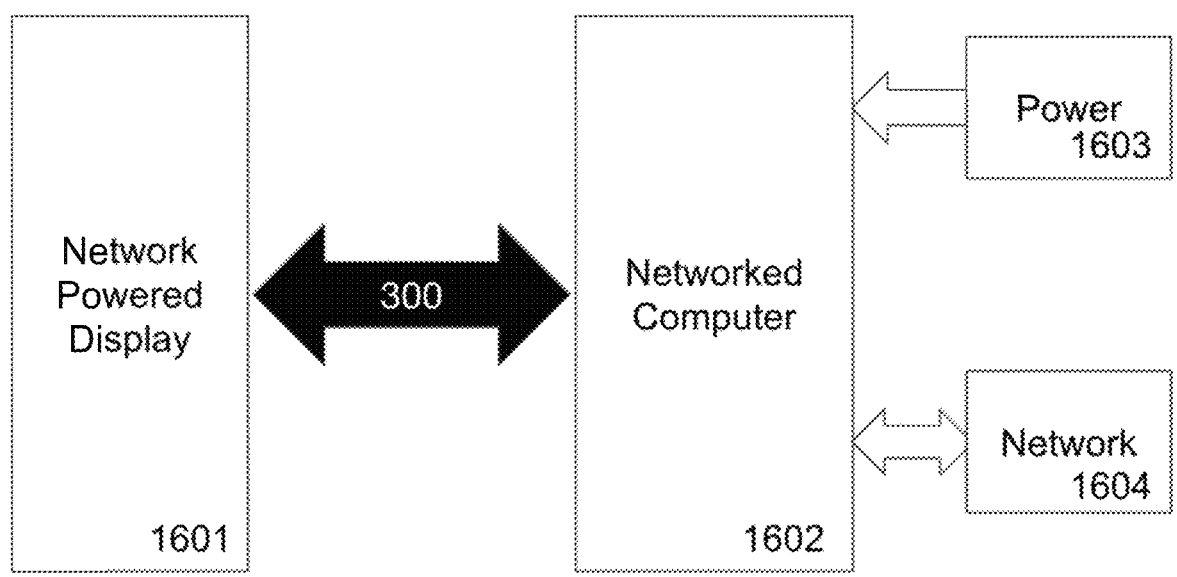
FIG. 16 shows a block diagram of a display system according to certain embodiments of the disclosure.

In one simplified embodiment of this invention, FIG. 15 depicts a PCI express (PCIe) Video Graphics Card or Display Adapter 1503, where the power from the ATX power supply 1501 is used substantially for powering the display 1504, through a network interface 300, where a receiver 1505 provides local and isolated power for an externally attached display 1504, although it would be understood from anyone skilled in the art, that the Receiver may be embedded within the Display device itself to form a the yet more simplified invention in FIG. 16, where a Network Powered Display is powered through a Network cable where the power is delivered through a Networked Computer and where the power is sourced from a Power supply attached to the computer.

Some motherboards may not have USB headers or not enough USB headers. In such cases the Transmitter 100 may not be able to use the USB cable 1111 from connector 111. In this case, the Transmitter may utilize a USB Host Controller 821 that is mounted on the PCB 102 and connected to the PC through the PCI express bus 812. The USB ports will then show up on the PC through a USB hub just as if they were connected through a USB cable 1111 from port 111.

FIG. 16 shows a block diagram of a display system according to certain embodiments of the disclosure. Specifically, FIG. 16 shows yet the most simplified embodiment where a Networked Display 1601 is powered by a Networked Computer 1602 powered from an external power supply 1603 where the display 1601 is connected to the computer through a single cable 300, and where the display 1601 get its power through the network cable 300.

Figure 17:
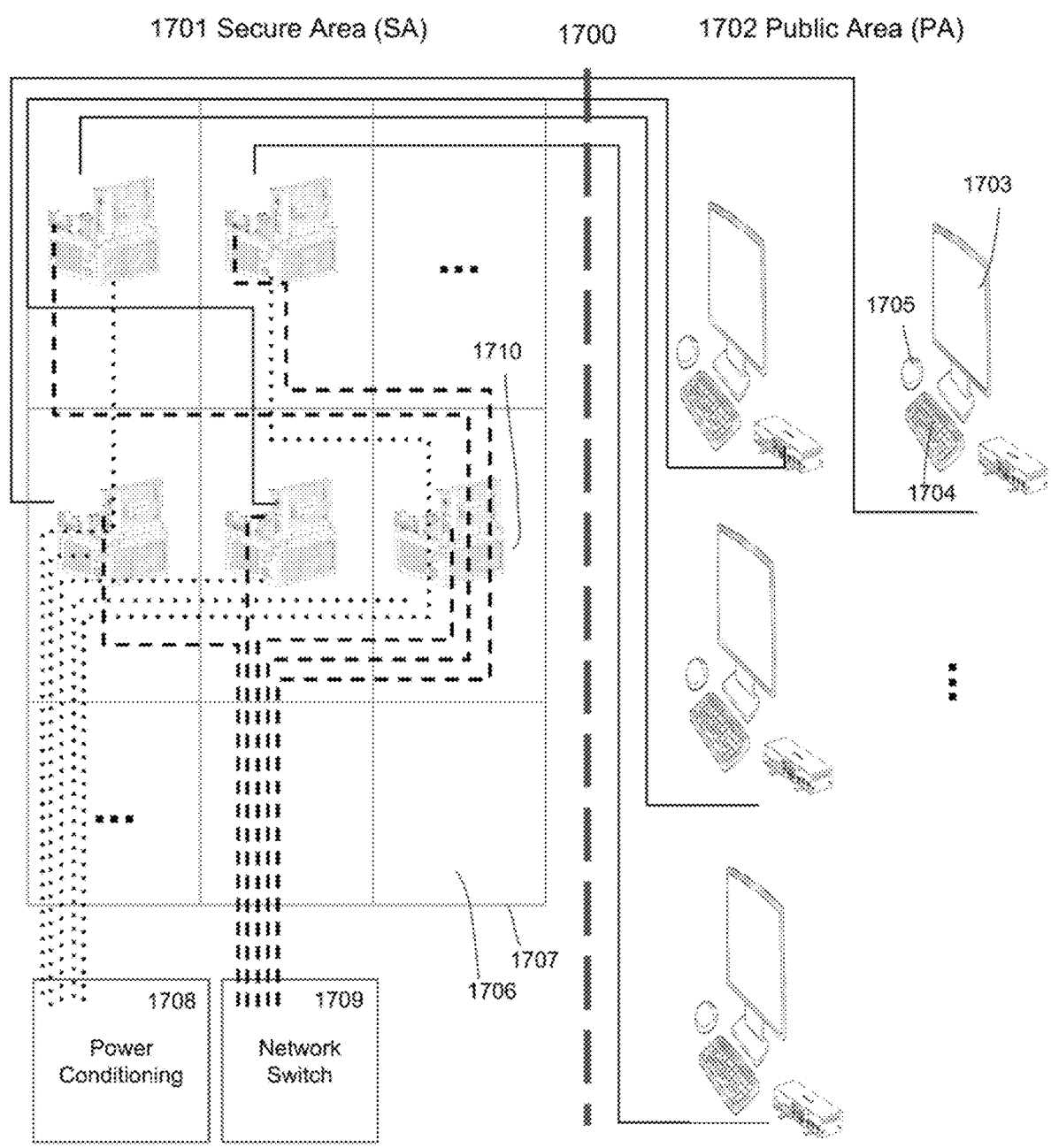
FIG. 17 shows a schematic component arrangement for Secure Area and Public Area (SA/PA) Applications according to certain embodiments of the disclosure.

FIG. 17 shows a schematic component arrangement for Secure Area and Public Area (SA/PA) Applications according to certain embodiments of the disclosure. One aspect of this invention teaches a series of popular use cases that can be ideally and advantageously solved by using a combination of the Transmitter 100 and a PC Motherboard 801 in a Minimalist Chassis System 1000, with an ATX Power Supply 802, placed in a Secure Area (SA) 1701, typically within shelves 1706, or a shelving system 1707, which is wired with individual Network cables (Wired or Optical) with power, to a Public Area (PA) 1702, where Receivers 200 are placed and typically connected to PC monitors 1703, Keyboards 1704, and Mice 1705, and other peripherals, such as Wireless Chargers, Payment Terminals, WiFi access Points, NFC, Credit Card Readers, Gaming Hardware such as Joysticks, coin or money acceptor and money payout devices, also commonly used in vending machines and Purchasing of Goods Interfaces (POGIs).

In certain embodiments, the ATX power supply 802 is mounted within two identical brackets, and where a PC motherboard is mounted on top of the ATX power supply and affixed to the two identical brackets through standoffs, and where a threaded rod is mounted vertically through a rod mount, and a PCI card affixed to the rod through a thumbscrew, this system to be known as the "Minimalist Chassis System."

The Secure Area (SA) 1701 may be located in a compartmentalized area ranging from a simple lockable closet to a fully secured fireproof impenetrable vault. The Public Area (PA) 1702 may be located in an area ranging from a public outdoor space to an indoor area within an establishment, such as an Internet Cafe, a Bank, a Casino, a place of business with Access control, or a Security Guard Front Desk. One popular use case would be where the Secure Area and the Public Area simply are two areas within a residence or business, where neither area needs to be public, but where the architectural computing model of having the BackEnd (BE) and the Front End (FE) separated for practical, visual, ornamental or acoustical reasons. In certain embodiments, no power supply or power outlet is required in the vicinity of the PAs, because all necessary use functions such as connectivity to the Internet, charging of Cellular Telephones, Battery Banks, etc is made possible by the availability of charging through the Receiver.

The terms SA/PA and BE/FE are first used here in this specification, and the models may be appreciated for many reasons, in a number of types of areas, and in any number of use cases. Examples are; Studios, where BEs need be separated from FEs for noise, cooling, security and practical reasons; Factories and Power Plants, where equipment and operations need be separated for safety and proximity reasons; Casinos for servicing, maintenance, and regulatory reasons; homes for noise and architectural ornamental reasons; Surveillance, for security reasons; Retail, Fast Food, Banks, and Kiosks, for uninterrupted serviceability and financial transaction security reasons; Education and Worship, for pedagogic, impressiveness, visual impact reasons; Advertising and Digital Signage, for architectural and aesthetic reasons, Quick Service Restaurants, for practical, regulatory, and proximity reasons.

It is with the real-world practical applications listed above in mind, that this invention teaches the most practical, secure, scalable, complete, practical, and economic solution to the SA/PA and BE/FE application challenge yet to date is presented herein.

A substantial benefit of the SA/PA model is that one can keep additional SA units on standby, and when any problem is experienced or any service is required, the network cable can be switched from a troublesome node to a ready node 1710.

The Power Conditioning Unit 1708 may be a simple power strip, a surge protected power distribution system, or a sophisticated power backup system including power quality conditioning as well as an Uninterruptible Power Supply (UPS).

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A network video transmitter comprising:
   a video input configured to receive a video signal;
   a network video processor configured to control the video signal received by the video input to be transmitted to a network video receiver;
   a network port configured to be connected to the network video receiver via a network cable, wherein the network cable is configured to transmit the video signal processed by the network video processor to the network video receiver and transmit power between the network video transmitter and the network video receiver, and the network cable has power conductors capable of carrying the power;
   a power connector being connected to a power supply of a host computing device, wherein the power supply is configured to convert an alternating current (AC) power to standby power and normal operating power, and to provide the standby power and the normal operating power to the power connector, such that the normal operating power is provided for operation of both the network video transmitter and the network video receiver; and a sensing circuit, powered from the standby power and connected to the power conductors of the network cable, wherein when the sensing circuit senses one or more voltage pulses across the network cable, the sensing circuit enables full power of the host computing device,
   wherein connector headers connect in parallel with the standard two-pin power and reset switches found on headers of a motherboard of the host computing device for controlling power and reset of the host computing device, allowing the network video transmitter locally and the network video receiver remotely to power up, power down and reset the motherboard of the host computing device, and allows for the network video transmitter to see that a local operator has physically pressed the power or reset button of the host computing device.

2. The network video transmitter of claim 1, wherein the network port is an Ethernet local area network (LAN) port or a fiber optical network port, and the network cable is a CAT-5 or CAT-6 Ethernet cable or a fiber optic cable.

3. The network video transmitter of claim 1, wherein the video input is DVI, HDMI, DisplayPort, Thunderbolt 3 or USB type-C(USB-C).

4. The network video transmitter of claim 3, wherein the video signal passes through a Display Stream Compression (DSC) circuit.

5. The network video transmitter of claim 1, further comprising an isolated power converter, wherein the isolated power converter electrically or galvanically isolates the power so that no current will flow through ground even if the network video receiver and network video transmitter chassis are grounded to a different voltage potential.

6. The network video transmitter of claim 1, wherein the host computing device is a minimalist chassis system.

7. A network video receiver comprising:
a video output, communicatively connected to a display device, and configured to transmit a video signal to the display device;
a network video processor configured to control the video signal received from a network video transmitter to be transmitted to the display device via the video output;
a network port configured to be connected to the network video transmitter via a network cable, wherein the network cable is configured to transmit the video signal from the network video transmitter to the network video receiver and transmit power between the network video transmitter and a corresponding video receiver, and the network cable has power conductors capable of carrying power;
a power connector being connected to a power supply of a host computing device through the network video transmitter, wherein the power supply is configured to convert an alternating current (AC) power to normal operating power, and to provide the normal operating power to the power connector through the network video transmitter, such that the normal operating power is provided for operation of both the network video transmitter and the network video receiver;
a power button being connected to a power button header of the network video transmitter through the network video processor, such that when power of the host computing device being connected to the network video transmitter is on, a push on the power button of the network video receiver causes a power switch on the host computing device to be closed, thus initiating a power down event on the host computing device; and
a rechargeable battery electrically connected to the power connector, wherein the rechargeable battery is configured to be charged by the normal operation power during a normal operation, and when the power supply of the host computing device is off, the rechargeable battery is configured to generate voltage pulses and send the voltage pulses to the power conductors of the network cable to indicate the network video transmitter to power up the power supply of the host computing device in a operation mode.

8. The network video transmitter of claim 7, wherein the network port is an Ethernet local area network (LAN) port or a fiber optical network port, and the network cable is a CAT-5 or CAT-6 Ethernet cable or a fiber optical cable.

9. The network video receiver of claim 7, wherein the video output is DVI, HDMI, DisplayPort, Thunderbolt 3 or USB type-C(USB-C).

10. The network video receiver of claim 9, wherein the video signal passes through a Display Stream Compression (DSC) circuit.

11. The network video receiver of claim 7, further comprising an isolated power converter that supplies the voltages required for components within the network video receiver.

12. The network video receiver of claim 7, wherein when the power of the host computing device is off and the power button of the network video receiver is pushed, a battery connected to a voltage step-up circuit delivers a series of voltage pulses on the power conductors of the network cable that is sensed by a circuit on the Transmitter running from standby power, and that simulates a power switch press to the Host PC, causing the PC to power up as it normally would when the power button is pressed.

13. The network video receiver of claim 7, further comprising a reset button, wherein the reset button of the network video receiver are connected to the power button header of the network video transmitter through the network video processor, such that when the power of the host computing device being connected to the network video transmitter is on, a push on the reset button of the network video receiver causes a reset switch on the host computing device to be closed, thus initiating a reset event on the host computing device.

14. The network video receiver of claim 7, further comprising an internal power circuit capable of receiving power from the power conductors of the network cable, wherein the isolated power converter electrically or galvanically isolates the power so that no current will flow through ground even if the network video transmitter and network video receiver chassis are grounded to a different voltage potential.

15. The network video receiver of claim 7, wherein a number of electrically conductive pins representing the video output and other various interfaces of the network video receiver are made available for a secondary Printed Circuit Board Assembly (PCBA) to be temporarily or permanently attached, wherein the secondary PCBA forms an Expansion Board (EB) module.

16. A display system comprising:
a network video transmitter with a video input, configured to be placed in a minimalist chassis system, and configured to be communicatively connected to a power supply of the minimalist chassis system located in a secure area (SA);
a network video receiver with a video output located in a public area (PA), and configured to be communicatively connected to a display device; and
a network cable connecting the network video transmitter to the network video receiver, wherein the network cable is configured to transmit the video signal from the network video transmitter to the network video receiver and transmit power between the network video transmitter and the network video receiver, and the network cable has power conductors capable of carrying the power;

wherein the power supply is configured to provide power to both the network video transmitter and the network video receiver, and no power supply is required in the PA;

wherein the network video receiver comprises:
- a network video processor configured to control the video signal received from the network video transmitter through the network cable; and
- a power button, being connected to a power button header of the network video transmitter through the network video processor, such that when power of the minimalist chassis system is on, a push on the power button of the network video receiver causes a power switch on the minimalist chassis system to be closed, thus initiating a power down event on the minimalist chassis system.

17. The system of claim 16, wherein the network video receiver further comprises a rechargeable battery, wherein the rechargeable battery is configured to be charged by a normal operation power transmitted from the power supply of the minimalist chassis system through the network video transmitter during a normal operation, and when the power supply of the minimalist chassis system is off, the rechargeable battery is configured to generate voltage pulses and send the voltage pulses to the power conductors of the network cable to indicate the network video transmitter to power up the power supply of the minimalist chassis system in an operation mode.

18. The system of claim 17, wherein the network video transmitter comprises a sensing circuit, powered from a standby power provided by the power supply of the minimalist chassis system and connected to the power conductors of the network cable, wherein when the sensing circuit senses the voltage pulses across the network cable, the sensing circuit powers up the power supply of the minimalist chassis system in an operation mode.

19. The system of claim 16, wherein the power supply is an ATX power supply and is mounted within two identical brackets, a PC motherboard is mounted on top of the ATX power supply and affixed to the two identical brackets through standoffs, a threaded rod is mounted vertically through a rod mount, and a PCI card is affixed to the rod through a thumbscrew.

* * * * *